United States Patent
Kadambala et al.

(10) Patent No.: US 10,594,921 B2
(45) Date of Patent: Mar. 17, 2020

(54) DUAL PHASE DETECTION POWER OPTIMIZATIONS

(71) Applicant: QUALCOMM Incorporated, San Diego, CA (US)

(72) Inventors: Ravi Shankar Kadambala, Hyderabad (IN); Micha Galor Gluskin, San Diego, CA (US); Soman Ganesh Nikhara, Hyderabad (IN); Bapineedu Chowdary Gummadi, Hyderabad (IN); Pradeep Veeramalla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 15/963,803

(22) Filed: Apr. 26, 2018

(65) Prior Publication Data

US 2019/0335089 A1 Oct. 31, 2019

(51) Int. Cl.
*H04N 5/232* (2006.01)
*G06K 9/32* (2006.01)

(52) U.S. Cl.
CPC ....... *H04N 5/23212* (2013.01); *G06K 9/3233* (2013.01); *H04N 5/23241* (2013.01)

(58) Field of Classification Search
CPC ........... H04N 5/23212; H04N 5/23241; G06K 9/3233
See application file for complete search history.

(56) References Cited

U.S. PATENT DOCUMENTS

| | | | | |
|---|---|---|---|---|
| 2007/0122137 A1* | 5/2007 | Ohnishi | ................. | G03B 13/34 396/123 |
| 2013/0063651 A1* | 3/2013 | Yoshioka | ........... | H04N 5/23212 348/353 |
| 2015/0092066 A1* | 4/2015 | Geiss | ................... | H04N 5/2258 348/180 |
| 2017/0212327 A1* | 7/2017 | Lee | ..................... | H04N 5/3696 |
| 2017/0230649 A1* | 8/2017 | Galor Gluskin | ..... | H04N 17/002 |

\* cited by examiner

*Primary Examiner* — Gevell V Selby
(74) *Attorney, Agent, or Firm* — Holland & Hart LLP

(57) ABSTRACT

Methods, systems, and devices for dual phase detection auto focus (PDAF) power optimization are described. A camera device may capture a frame including a pixel array representing a scene. In some examples, each pixel of the pixel array may be a phase detection (PD) pixel having one or more values, or one or more PD pixels positioned randomly across the pixel array. The camera device may identify a configuration of the pixel array, and determine a condition of the pixel array relative to the configuration. The configuration may be a binning configuration or a frame pattern configuration, and the condition may include an illumination condition related to the pixel array representing the scene. The camera device may determine and apply a reconfiguration to at least a portion of the pixel array based on the condition of the pixel array, and determine a lens position of the camera device therewith.

20 Claims, 11 Drawing Sheets

DUAL PHASE DETECTION POWER OPTIMIZATIONS

BACKGROUND

The following relates generally to a camera device, and more specifically to phase detection auto focus (PDAF) power optimization.

User equipments (UEs) such as mobile devices are widely deployed to provide various types of communication and functional features such as image capturing, video recording, multimedia communication, and/or others. UEs employing cameras may perform an operation to change a position of a camera lens to focus on a subject (e.g., individual) within a scene. In some cases, this operation may include a phase detection (PD) measurement of a phase difference between pixels. The accuracy of the PD measurement may depend on various factors of a scene. Processing of the PD pixel data is data intensive and power consuming for a UE. Therefore, processing PD pixel data while also reducing memory and power utilization related to the processing may be desirable.

SUMMARY

The described techniques relate to improved methods, systems, devices, or apparatuses that support phase detection auto focus (PDAF) power optimization. A camera device may capture a frame including a pixel array representing a scene. In some examples, each pixel of the pixel array may be a phase detection (PD) pixel having one or more values, or one or more PD pixels positioned randomly across the pixel array. The camera device may identify a configuration of the pixel array, and determine at least one condition of the pixel array relative to the configuration. In some examples, the configuration may include a binning configuration or a frame pattern configuration, and the at least one condition may include an illumination condition related to the pixel array representing the scene. The camera device may determine and apply a reconfiguration to at least a portion of the pixel array based on the at least one condition of the pixel array, and determine a lens position of the camera device therewith A method for operating a camera device that supports PDAF power optimization is described. The method may include capturing, by a sensor of the camera device, a frame comprising a pixel array representing a scene, identifying a configuration of the captured pixel array, determining at least one condition of the captured pixel array relative to the configuration, determining a reconfiguration to be applied to the captured pixel array based at least in part on determining the at least one condition of the captured pixel array, and applying the reconfiguration to at least a portion of the captured pixel array.

An apparatus that supports PDAF power optimization is described. The apparatus may include means for capturing, by a sensor of the apparatus, a frame comprising a pixel array representing a scene, means for identifying a configuration of the captured pixel array, means for determining at least one condition of the captured pixel array relative to the configuration, means for determining a reconfiguration to be applied to the captured pixel array based at least in part on determining the at least one condition of the captured pixel array, and means for applying the reconfiguration to at least a portion of the captured pixel array.

Another apparatus that supports PDAF power optimization is described. The apparatus may include a processor, memory in electronic communication with the processor, and instructions stored in the memory. The instructions may be executable by the processor to cause the apparatus to capture, by a sensor of the apparatus, a frame comprising a pixel array representing a scene, identify a configuration of the captured pixel array, determine at least one condition of the captured pixel array relative to the configuration, determine a reconfiguration to be applied to the captured pixel array based at least in part on determining the at least one condition of the captured pixel array, and apply the reconfiguration to at least a portion of the captured pixel array.

A non-transitory computer-readable medium storing code that supports PDAF power optimization at a device is described. The code may include instructions executable by a processor to capture, by a sensor of a camera device, a frame comprising a pixel array representing a scene, identify a configuration of the captured pixel array, determine at least one condition of the captured pixel array relative to the configuration, determine a reconfiguration to be applied to the captured pixel array based at least in part on determining the at least one condition of the captured pixel array, and apply the reconfiguration to at least a portion of the captured pixel array.

Some examples of the method, apparatus, and non-transitory computer-readable medium described herein may further include operations, features, means, or instructions for determining a lens position for the apparatus based at least in part on applying the reconfiguration, determining that a confidence level associated with the lens position is above a threshold by comparing the confidence level to the threshold, and capturing a second frame comprising a second pixel array using the lens position based on determining that the confidence level associated with the lens position is above the threshold. In some examples of the method, apparatus, and non-transitory computer-readable medium described herein, capturing the frame is based at least in part on an initial lens position that is different from the lens position.

Some examples of the method, apparatus, and non-transitory computer-readable medium described herein may further include operations, features, means, or instructions for initializing a binning factor associated with a binning configuration based at least in part on a preconfigured parameter of the sensor, the binning configuration comprising a set of binning factors, and applying the binning factor to the pixel array. In some examples of the method, apparatus, and non-transitory computer-readable medium described herein, identifying the configuration of the captured pixel array is based at least in part on applying the binning factor to the pixel array.

Some examples of the method, apparatus, and non-transitory computer-readable medium described herein may further include operations, features, means, or instructions for determining a lens position of the apparatus based at least in part on the binning factor, and determining a confidence level of an autofocus associated with the determined lens position based at least in part on the binning factor. In some examples of the method, apparatus, and non-transitory computer-readable medium described herein, determining the reconfiguration to be applied to the captured pixel array is based at least in part on determining the confidence level.

Some examples of the method, apparatus, and non-transitory computer-readable medium described herein may further include operations, features, means, or instructions for determining that the confidence level is above a threshold by comparing the confidence level to the threshold, performing a contrast AF fine search based at least in part on the confidence level being above the threshold, adjusting the lens position of the apparatus based at least in part on the contrast AF fine search, and capturing a second frame comprising a second pixel array representing the scene based at least in part on adjusting the lens position.

Some examples of the method, apparatus, and non-transitory computer-readable medium described herein may further include operations, features, means, or instructions for determining that the confidence level is below a threshold by comparing the confidence level to the threshold, initializing a timer based at least in part on the confidence level being below the threshold, and re-determining the lens position using a different binning factor from the set of binning factors after an expiration of the timer. In some examples of the method, apparatus, and non-transitory computer-readable medium described herein, determining the reconfiguration to be applied to the captured pixel array is based at least in part on re-determining the lens position.

Some examples of the method, apparatus, and non-transitory computer-readable medium described herein may further include operations, features, means, or instructions for determining that the confidence level is below a threshold by comparing the confidence level to the threshold. In some examples of the method, apparatus, and non-transitory computer-readable medium described herein, determining the reconfiguration for the captured pixel array is based at least in part on the confidence level being below the threshold. In some examples of the method, apparatus, and non-transitory computer-readable medium described herein, determining the at least one condition of the captured pixel array relative to the configuration comprises determining an illumination condition related to the pixel array representing the scene.

Some examples of the method, apparatus, and non-transitory computer-readable medium described herein may further include operations, features, means, or instructions for determining whether the binning factor is a minimum binning factor of the set of binning factors, and determining a lower binning factor associated the set of binning factors based at least in part on the illumination condition, wherein applying the reconfiguration to at least the portion of the captured pixel array is based at least in part on determining the lower binning factor.

Some examples of the method, apparatus, and non-transitory computer-readable medium described herein may further include operations, features, means, or instructions for determining a second binning factor of the set of binning factors based at least in part on determining whether the binning factor is the minimum binning factor of the set of binning factors. In some examples of the method, apparatus, and non-transitory computer-readable medium described herein, the second binning factor is different from the minimum binning factor of the set of binning factors and determining the reconfiguration to be applied to the captured pixel array is based at least in part on determining the second binning factor. In some examples of the method, apparatus, and non-transitory computer-readable medium described herein, applying the reconfiguration to at least the portion of the captured pixel array comprises applying the second binning factor.

Some examples of the method, apparatus, and non-transitory computer-readable medium described herein may further include operations, features, means, or instructions for determining the lens position of the apparatus based at least in part on applying the second binning factor, determining that the confidence level associated with the determined lens position is above the threshold by comparing the confidence level to the threshold, performing a contrast AF fine search based at least in part on the confidence level being above the threshold, and adjusting the lens position of the apparatus based at least in part on the contrast AF fine search.

Some examples of the method, apparatus, and non-transitory computer-readable medium described herein may further include operations, features, means, or instructions for performing a full contrast AF coarse search based at least in part on determining that the binning factor is the minimum binning factor of the set of binning factors, determining the lens position of the apparatus based at least in part on the full contrast AF coarse search, performing a contrast AF fine search based at least in part on determining the lens position, and adjusting the lens position of the apparatus based at least in part on the contrast AF fine search.

Some examples of the method, apparatus, and non-transitory computer-readable medium described herein may further include operations, features, means, or instructions for capturing, by the sensor of the apparatus, a second frame comprising a second pixel array, determining that the scene is static based at least in part on sensor data, a correlation of the frame with the second frame, or both, and disabling a frame pattern configuration associated with the captured second frame based at least in part on the scene being static. In some examples of the method, apparatus, and non-transitory computer-readable medium described herein, identifying the configuration of the captured pixel array is based at least in part on disabling the frame pattern configuration.

Some examples of the method, apparatus, and non-transitory computer-readable medium described herein may further include operations, features, means, or instructions for capturing, by the sensor of the apparatus, a second frame comprising a second pixel array, determining that the scene is dynamic based at least in part on sensor data, a correlation of the frame with the second frame, or both, and enabling a frame pattern configuration associated with the captured second frame based at least in part on the scene being dynamic. In some examples of the method, apparatus, and non-transitory computer-readable medium described herein, enabling the frame pattern configuration comprises skipping one or more frames based at least in part on a preconfigured number. In some examples of the method, apparatus, and non-transitory computer-readable medium described herein, identifying the configuration of the captured pixel array is based at least in part on disabling the frame pattern configuration.

Some examples of the method, apparatus, and non-transitory computer-readable medium described herein may further include operations, features, means, or instructions for determining, by the sensor of the apparatus, a region of interest (ROI) associated with the pixel array representing the scene. In some examples of the method, apparatus, and non-transitory computer-readable medium described herein, determining the at least one condition of the captured pixel array relative to the configuration is based at least in part on the determined ROI.

Some examples of the method, apparatus, and non-transitory computer-readable medium described herein may further include operations, features, means, or instructions for configuring the region of the pixel array to the ROI based at least in part on skipping pixels outside the ROI. In some examples of the method, apparatus, and non-transitory computer-readable medium described herein, determining the reconfiguration to be applied to the captured pixel array is based at least in part on configuring the region of the pixel array to the ROI.

In some examples of the method, apparatus, and non-transitory computer-readable medium described herein, each pixel of the pixel array comprises a PD pixel having one or more values. In some examples of the method, apparatus, and non-transitory computer-readable medium described herein, the pixel array comprises one or more PD pixels positioned randomly across the pixel array.

DETAILED DESCRIPTION

A phase detection auto-focus (PDAF) camera sensor may perform autofocus (AF). Processing of phase detection (PD) data and pixel data may be both data exhaustive and power consuming for a device such as a smartphone. As an example, an image signal processor (ISP) may operate at higher speed (e.g., 2×), to sample the pixel data as well as PD data, which consumes additional memory and power for the device. The described techniques provide processing PDAF camera sensor data, while reducing memory and power utilization related to the processing.

To reduce memory and power utilization when processing PDAF camera sensor data, the data (e.g., PD pixels) may be binned, or skipped, or both based on one or more conditions. For example, a predetermined region of pixels (e.g., 2×1, 4×1, 8×1) may be binned based on lighting conditions (e.g., low light vs. bright light), a confidence level threshold, a region of interest (ROI), or a scene change, among other aspects. A confidence level and defocus value (e.g., lens shift) may be calculated to estimate an initial lens position. The confidence level can be calculated for each PD data measurement, which may be indicative of a likelihood that the PD data measurement is accurate. When the confidence level is below a threshold, the ISP may modify (e.g., reduce the size of) the region of pixels and recalculate a new confidence level and defocus value to estimate an updated lens position. Additionally, when the confidence level is below a threshold for a repeating numeration of PD data measurements, the ISP may perform a full contrast AF method to determine a lens position. In some implementations, the improved techniques may perform dynamic adjustment for a frame pattern for skipping processing of PD data (e.g., in the case of a dynamic scene).

Aspects of the disclosure are initially described in the context of a system for a camera device. Aspects of the disclosure are then described in the context of a configuration that relates to dual PDAF power optimization. Aspects of the disclosure are further illustrated by and described with reference to apparatus diagrams, system diagrams, and flowcharts that relate to dual PDAF power optimization.

Figure 1:
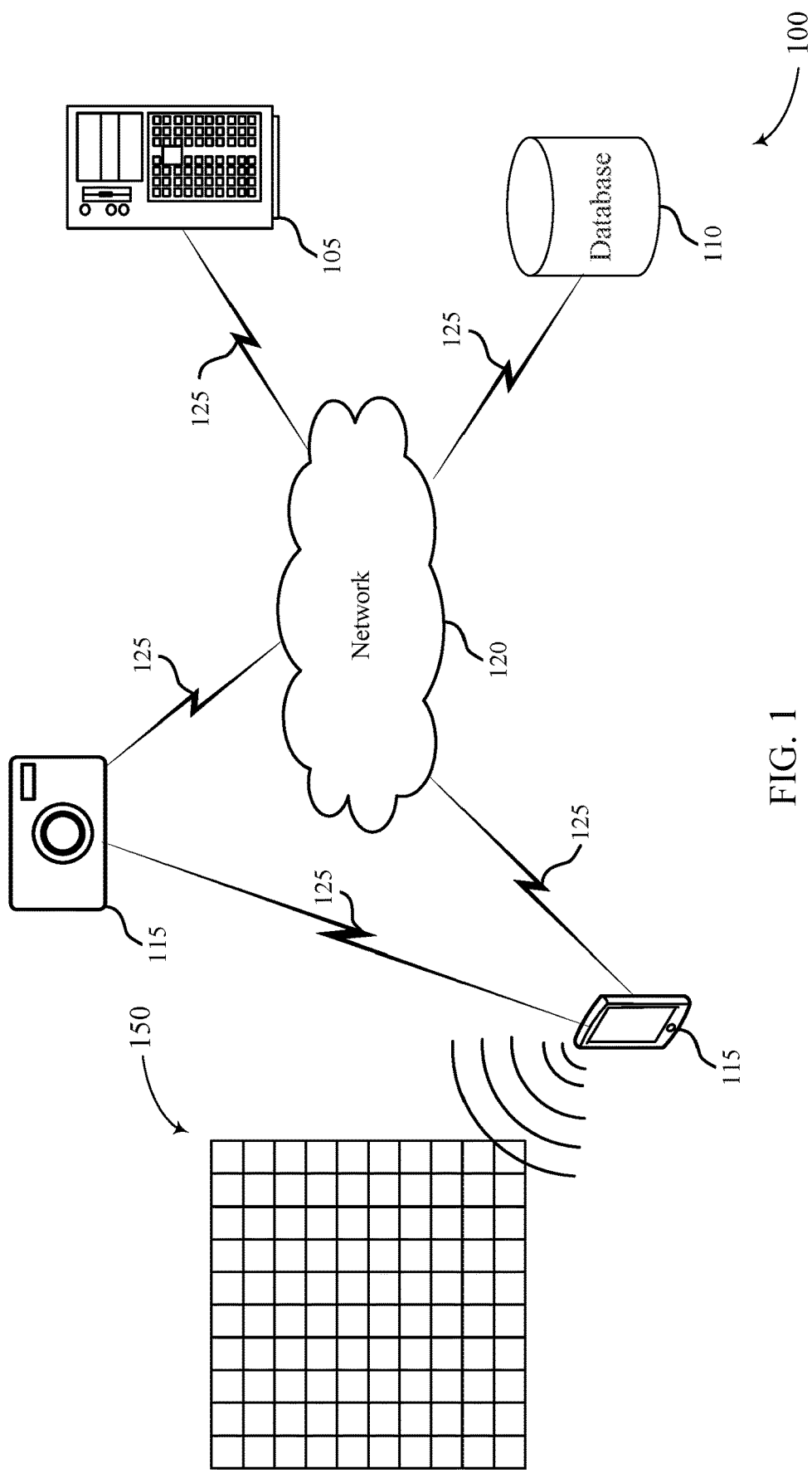
FIGS. 1 through 3 illustrate examples of a system for a camera device that supports phase detection auto focus (PDAF) power optimization in accordance with aspects of the present disclosure.

FIG. 1 illustrates a system 100 for a camera device that supports PDAF power optimization in accordance with aspects of the present disclosure. The system 100 may include a server 105, a database 110, and devices 115. The system 100 may support dual PDAF power optimization when performing AF including determining a lens position for bringing a scene into focus when capturing an image of the scene.

Devices 115 may be dispersed throughout the system 100. In some examples, devices 115 may be stationary and/or mobile. In some examples, devices 115 may include a cellular phone, a smartphone, a digital camera, a standalone camera, a kiosk, a photo booth, a personal digital assistant (PDA), a wireless communication device, a handheld device, a tablet computer, a laptop computer, a cordless phone, a display device (e.g., monitors), and/or the like. Devices 115 may, additionally or alternatively, include or be referred to by those skilled in the art as a user equipment (UE), a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

Devices 115 may include memory, a processor, an output, and a communication module. The processor may be a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like. The processor may be configured to process image data from and/or write image data to the memory. The processor may also be configured to provide image enhancements, image restoration, image analysis, image compression, and image synthesis. In an example where device 115 includes a camera, the processor may also be configured to determine or perform adjustments to a lens position associated with the camera, according to the techniques described herein.

The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, devices 115 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, capturing, processing, and displaying image data.

The processor of devices 115 may be operable to control operation of the output of devices 115. For example, the output may be the integral display of a tablet and/or smart phone. In some examples, an output module may include, for example, a High Definition Multimedia Interface™

(HDMI) connector, a Video Graphics Array (VGA) connector, a Universal Serial Bus™ (USB) connector, a tip, ring, sleeve (TRS) connector, and/or any other suitable connector operable to couple devices 115 to the output.

Devices 115 may also include a sensor. The sensor may receive information such as packets, user data, or control information associated with various information channels (e.g., control channels, data channels, and information related to PDAF power optimization, etc.). Information may be passed on to other components of devices 115. In some cases, the sensor may be an image sensor for capturing photos and video. Device 115 may use an image sensor to capture a pixel array 150 (e.g., an image) representing a scene. For example, the sensor may generate a two-dimensional pixel array representing the scene. In some cases, the two-dimensional pixel array may be generated in the Bayer domain (e.g., based on a filter coupled with photodiodes including one or more sensors). In another example, the sensor may be a dual PDAF sensor, an optical depth sensor (e.g., for determining or estimating a depth of an object or scene with respect to device 115), a lux sensor (e.g., for detecting an illumination condition, luminance levels related to a scene), a motion sensor (e.g., for detecting motion associated with a scene), an infrared heat sensor (e.g., for detecting humans and animals vs. objects in a scene), among others. A sensor may also be configured with multiple functionalities. For example, a single sensor may be capable to perform operations related to a PDAF sensor, an optical depth sensor, a motion sensor, or a lux sensor, or any combination thereof.

A sensor (e.g., a PDAF sensor) may be configured with a device 115 for performing AF operations. In some examples, a PDAF sensor may be a sensor where each pixel in a camera sensor array is a PD pixel. For example, the pixel array 150 may include a number of pixels. In some cases, each pixel of the pixel array 150 may be a PD pixel. Alternatively, one or more pixels of the pixel array 150 may be a PD pixel and positioned randomly across the pixel array 150. In some examples, a dual PDAF sensor may be a 12M sensor that may have 24M pixels. Device 115 may use PD pixel values to determine a defocus distance i.e., a lens position. In some cases, the PDAF sensor may capture one or more frames representing a scene. Device 115 may use pixel data (e.g., PD data) in each frame to determine a defocus distance based on a confidence level. For dual PDAF sensors, device 115 may need to process 12M PD pixel data, which may be process extensive and power consuming for device 115. In addition, a processor of device 115 may have to run at higher speed (e.g., 2×) to sample the pixel data as well as the PD data. As a result, these operations consume extra memory and power for device 115.

According to the described techniques herein, device 115 may support processing PDAF camera sensor data, while reducing memory and power consumption related to the processing. To reduce memory and power utilization when processing PDAF camera sensor data, the data may be binned, or skipped, or both based on one or more conditions (e.g., lux level of a scene, dynamic scene, static scene, ROI). For example, a processor of device 115 may apply a configuration for determining and adjusting a lens position to improve a focus of the scene related to the pixel array 150. In some examples, device 115 may use phase difference detection sensors to perform autofocus. A processor (e.g., ISP) clock may depend on sensor data throughput. For example, for a 12M data at 30 Fps, the processor clock may require 480M. The described techniques herein, may provide a reduction in the clock of a processor of device 115. For example, with 4× binning, the processor clock may be reduced by 4× and with 2× binning the clock may be reduced by 2×. As PD data is less separated, latency for processing the PD data by the processor will be reduced.

In the example that a device 115 is configured with an image sensor (e.g., camera) having at least one lens, the lens may be coupled to an actuator and may be moved by the actuator to adjust a lens position of the lens. The actuator may be a micro-electronic mechanical system (MEMS) actuator, an open-loop voice coil motor (VCM) actuator, or a closed-loop VCM, among other examples. The movement of the lens may affect a focus of the scene in the captured pixel array 150. In some cases, the actuator may be configured to move the lens in a sequence of one or more lens movement during an AF operation, for example, adjusting a lens position to change a focus of an image.

Additionally, to improve a focus of the scene related to the pixel array 150, device 115 may apply a PDAF algorithm followed by, in some cases, an AF fine search to determine and adjust a lens position. For instance, in some cases, there can be some variation in PDAF data module manufacturing artifacts that may be configured on a processor of device 115. Device 115 may be calibrated with gain maps and depth correction coefficients, which may be stored in memory of device 115 to correct the PDAF data due to manufacturing artifacts. As such, a PDAF algorithm may receive as input the calibration data along with the PDAF data and output a defocus distance and confidence level of the PDAF data.

In some cases, the PDAF algorithm may output results that may be less than acceptable (i.e., not meeting a focus threshold). In this case, device 115 may switch and perform contrast AF to do a fine search. In some examples, phase difference detection may be varied by various factors such as lens and sensor manufacture issue, captured object's texture, color, distance, and capture conditions such as luminance. By performing the contrast AF and fine search, device 115 may search and confirm a final peak position on a defocus estimation and phase difference graph. As such, device 115 may perform AF fine search to determine a lens position giving an optimal focus for the scene represented in the captured pixel array 150. Device 115 may then re-capture the pixel array 150 using the adjusted lens position. In some examples, device 115 may upload the re-captured image to database 110 via server 105.

Server 105 may be a computing system or an application that may be an intermediary node in the system 100 between one or more devices 115 or database 110. The server 105 may include any combination of a social network server, data server, a cloud server, a server associated with an automation service provider, proxy server, mail server, web server, application server, database server, communications server, file server, home server, mobile server, name server, or any combination thereof. Server 105 may include an application distribution platform. For example, a device 115 may upload or download applications such as social network applications for uploading, posting multimedia (e.g., images, audio, video). In another example, a device 115 may download an image processing application from server 105. The image processing application may provide image enhancements, image restoration, image analysis, image compression, and image synthesis. For example, device 115 may provide image enhancements, image restoration, image analysis, image compression, and image synthesis to the scene captured in the pixel array 150.

Database 110 may store data that may include PDAF data, PD pixel data, images, video, configuration files, and any other data that may be used by device 115 or an application executing and running on device 115 for supporting dual PDAF power optimization. For example, upon receiving a request to provide a configuration file to device 115, server 105 may parse and retrieve the configuration file, from the database 110, based on the information provided in the request (e.g., configuration identifier, operating system type (e.g., Linux, Unix, Mac OS X, Windows, etc.) of device 115) and provide the configuration file to device 115 via the communication links 125. Device 115 may receive the configuration file and apply it to an image processing operation. For example, device 115 apply the configuration file to an image signal processor (ISP) to use in determining a lens position related to a camera of device 115. The configuration file may include a binning configuration or a frame pattern configuration, or both.

System 100 may also include a network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)) for example), etc. Network 120 may include the Internet.

The wireless communication links 125 shown in the system 100 may include uplink (UL) transmissions from a device 115 to server 105, and/or downlink (DL) transmissions, from server 105 to device 115. The downlink transmissions may also be called forward link transmissions while the uplink transmissions may also be called reverse link transmissions. The wireless communication links 125 may transmit bidirectional communications and/or unidirectional communications. Wireless communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to wireless communication systems.

Figure 2A:
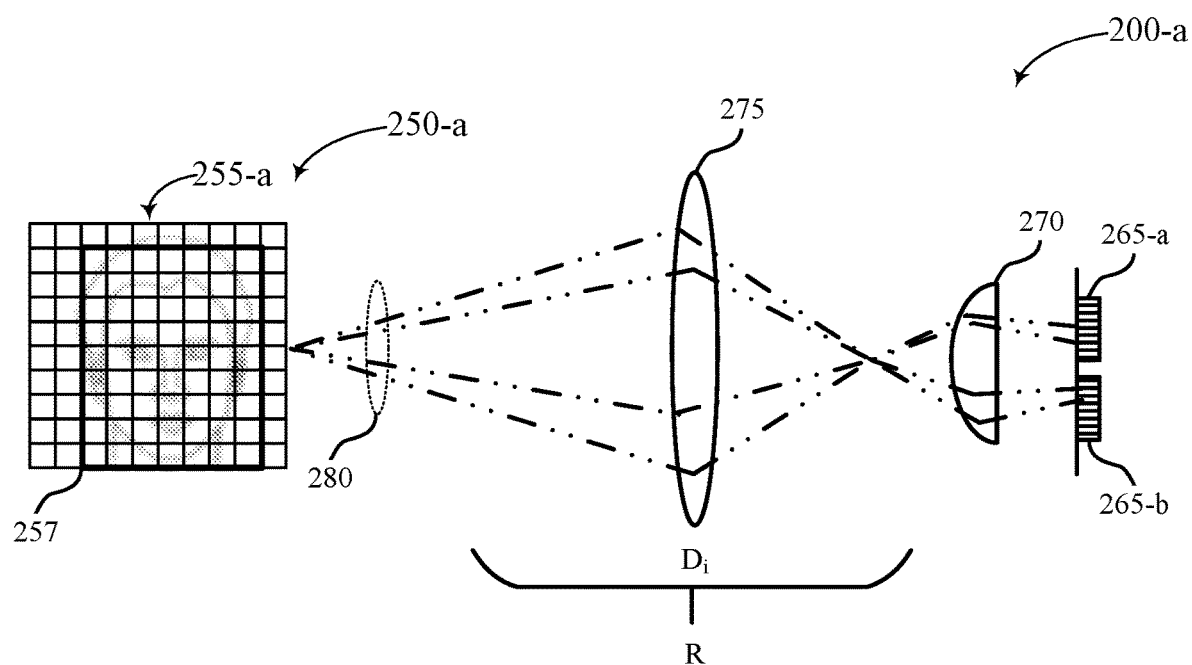
Figure 2B:
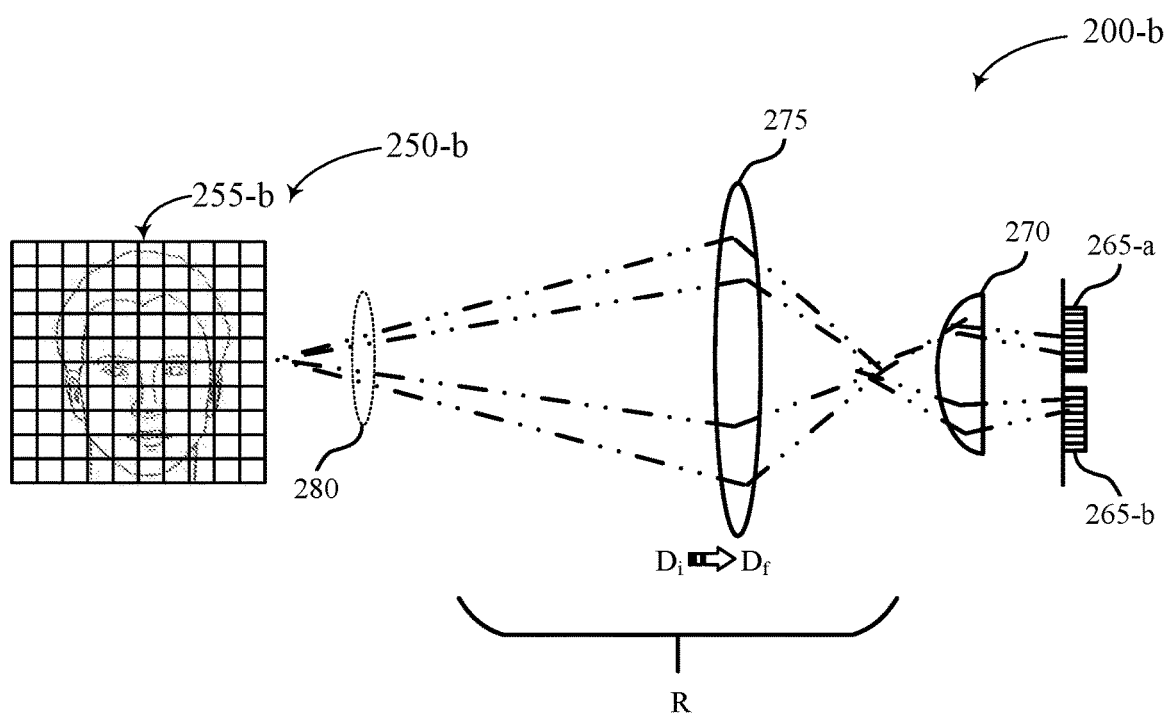

FIGS. 2A and 2B illustrate examples of a system 200 that support PDAF power optimization in accordance with various aspects of the present disclosure. In some examples, system 200 may implement aspects of system 100. System 200-a illustrates an example out-of-focus condition and system 200-b illustrates an example in-focus condition. System 200 may include an image sensor including a phase detection diode 265-a and a phase detection diode 265-b. System 200 may also include a multi-diode microlens 270 and a lens 275. The image sensor including the phase detection diode 265-a and the phase detection diode 265-b, the multi-diode microlens 270, and the lens 275 may be examples of aspects of a device 115 as described herein.

Device 115 may capture, by a sensor of device 115, a frame including a pixel array 250 representing a scene 255. As part of capturing the pixel array 250, light rays 280 may enter the lens 275, which may be split into multiple set of light rays (e.g., a first set of light rays and second set of light rays). The light rays 280 may travel from a point in a target scene through the lens 275 for focusing the target scene onto an image sensor including the phase detection diode 265-a and the phase detection diode 265-b. In some cases, the light rays 280 may travel through the microlens 270 before falling on the phase detection diode 265-a and the phase detection diode 265-b.

When an image is in focus, the light rays 280 may converge at a plane of the phase detection diode 265-a and the phase detection diode 265-b. For example, pixel array 250-b representing scene 255-b may be an in-focus image. Alternatively, when the light rays 280 converge in front or behind the plane of the phase detection diode 265-a and the phase detection diode 265-b, the image may be out-of-focus. For example, pixel array 250-a representing scene 255-a may be an out of focus image (e.g., blurred). In the case that the image is out-of-focus, the lens 275 can be moved forward (toward the image sensor) or backward (away from the image sensor). The lens 275 may be moved forward or backward within a position range R. Device 115 may determine an amount and direction of adjusting the lens 275 position to bring the image into focus based on processing pixels (e.g., PD pixels) or PDAF data, or any combination thereof related to the pixel arrays 250. Device 115 may, according to the described techniques herein, support processing sensor data (e.g., pixels, PD pixels, or PDAF data) to perform PDAF while reducing memory and power consumption of device 115.

Device 115 may identify a configuration for capturing a pixel array 250. In some examples, device 115 may identify the configuration prior to or after capturing pixel array 250. Device 115 may identify the configuration to improve power and performance for processing sensor data. In some examples, the configuration may be a binning configuration, or frame pattern configuration, or both. The binning configuration and the frame pattern configuration may be configured independently for device 115. For example, an image sensor of device 115 may perform operations related to the binning configuration and the frame pattern configuration, separately.

The binning configuration may include a set of binning factors for binning a predetermined region of pixels (e.g., 1×1, 2×1, 4×1, 8×1) and processing a pixel array 250 according to the binned region of pixels. For example, a 2×1 binning configuration may include aggregating pixel values of two separate pixels into a single pixel value. In some cases, binning pixels may include combining pixel values of two or more pixels that are adjacent to each other in a vertical direction, or a horizontal direction, or a diagonal direction of the pixel array 250. Aggregating pixel values by means of the binning configuration may result in an increased pixel value per combined pixel. Additionally, processing a pixel array 250 by means of the binning configuration may reduce memory and power consumption related to the processing of the pixel array 250 for device 115.

The frame pattern configuration may include skipping one or more frames based on a preconfigured number. For example, device 115 may skip a number of frames N based on whether a scene is static or dynamic, where N may be an integer. In some examples, device 115 may determine whether a scene 255 is static or dynamic (e.g., by performing frame correlation). For example, device 115 may capture two or more frames and compare the two or more frames to determine whether a scene is static or dynamic. As described with reference to FIG. 4, frame correlation may include performing scene recognition techniques, image recognition techniques, machine learning techniques, deep learning techniques, and/or convolutional neural network techniques, among other image related processing techniques.

Device 115 may capture a frame including pixel array 250-a representing scene 255-a, and identify a configuration for pixel array 250-a. The configuration may include device 115 initializing a binning factor associated with a binning configuration based on a preconfigured parameter of a sensor (e.g., image sensor) of device 115. In some cases, initializing the binning factor may occur prior to capturing pixel array 250-a. The preconfigured parameter may include applying a maximum binning factor to process the pixel array 250-a. For example, a maximum binning factor may be an 8×1 binning configuration, which may include combining pixel values of eight pixels that are adjacent (e.g., positioned, aligned, contacting) to each other in a vertical direction, or a horizontal direction, or a diagonal direction of the pixel array 250-a. In some examples, device 115 may perform one decimation (e.g., vertical decimation) instead of other decimation (e.g., horizontal decimation) because some decimation types may lower a PDAF quality.

Device 115 may determine an initial lens position $D_i$ for lens 275 based on processing the pixel array 250-a with the applied binning factor (e.g., 8×1 binning configuration). In some cases, device 115 may determine a confidence level of an AF associated with the determined initial lens position $D_i$. In one case, device 115 may perform PDAF which may be performed according to a phase difference measured between PD pixels of an image sensor to determine the initial lens position $D_i$. The accuracy of PDAF may be related to the accuracy and robustness of the phase difference measurement between PD pixels of the pixel array 250-a. As such, PDAF may infer a focal lens position (e.g., a lens position at which a captured image of a scene will be in focus), and a lens position value to move from an initial lens position $D_i$ to a focal lens position (e.g., $D_f$ with reference to FIG. 2B). The confidence level may indicate the likelihood that the initial lens position $D_i$ provides an acceptable focus or requires further adjustments. In some cases, device 115 may store histories of phase differences and confidence levels in a register or memory for retrieval by device 115. As such, device 115 may compare a current confidence level to a previous confidence level to determine whether it is above or below a threshold. The threshold and/or the confidence level may be predetermined or determined based on content of a scene. For example, a sharpness of contrast in the captured pixel array 250-a of the scene 255-a may affect the confidence level. As such, a threshold may be set to a value that may be appropriate for a sharpness of a contrast in a captured pixel array.

In an example of FIG. 2A, device 115 may determine that the confidence level is below a threshold by comparing the confidence level to the threshold. Device 115 may initialize a timer based on the confidence level being below the threshold, and re-determine a lens position using a different binning factor from a set of binning factors, after an expiration of the timer. In some cases, device 115 may determine a reconfiguration to be applied to the captured pixel array 250-a based on determining at least one condition of the captured pixel array 250-a. For example, the condition may be that the confidence level is below the threshold. In some examples, the condition may be an ROI related to the pixel array 250-a. For example, an ROI 257 may be selected based on an input at device 115 such as an individual touching a feature (e.g., face) represented by pixel array 250-a. As a result, a PDAF active region may be reconfigured to the ROI 257 to reduce data rate. In some examples, a zoom operation may be received. In this example, the PDAF active region size may be reconfigured based on a zoom ratio. In further examples, the condition may be, additionally or alternatively, an illumination condition related to the pixel array 250-a representing the scene 255-a. An illumination condition may indicate a lux level (e.g., luminance and luminous emittance related to a scene).

Device 115 may determine an adjustment to the binning configuration based on the ROI 257, or the illumination condition, or the determination that the confidence level is below the threshold, or any combination thereof. The binning configuration may be configured based on the ROI 257 that may include skipping pixels outside the ROI. In some cases, the binning configuration may be based on the illumination condition. That is, based on the illumination condition a binning factor associated with the binning configuration may be configured. For example, for low luminance, device 115 may apply 1×1 binning factor and for higher illuminance, device 115 may apply a higher binning factor (e.g., 4×1). A low illuminance may be a lux level that falls below a lux threshold (e.g., $L<L_T$, where L is a lux level and $L_T$ is lux threshold) and a higher illuminance may be a lux level that falls above a lux threshold (e.g., $L>L_T$). For example, a lux level may fall below a lux threshold, and as such device 115 may apply a 1×1 binning configuration. In another example, the lux level may fall above a lux threshold, and as such device 115 may apply a 4×1 binning configuration.

Additionally, a set of binning factors may be associated with an luminance that falls within a threshold range $-L_T<L<+L_T$, where $-L$ and $+L_T$ is a lower and upper lux threshold. In the case that the luminance falls within the threshold range, device 115 may progressively apply different binning factors of the set. The set of binning factors may be applied in a sequence of 8×1, 4×1, 2×1, and 1×1. For example, device 115 may initialize with an 8×1 binning factor and progress downward i.e., apply lower binning factors when having to re-determine a lens position.

In determining a reconfiguration to be applied to the captured pixel array 250-a, device 115 may determine whether a current binning factor is a minimum binning factor of the set. In the case that the current binning factor is not a minimum binning factor, device 115 may determine another (e.g., a lower) binning factor (e.g., 4×1) associated with the set for example, based on the illumination condition. After determining the other binning factor, device 115 may apply the second binning factor to a portion of the captured pixel array 250-a. Device 115 may determine the initial lens position $D_i$ based on processing the pixel array 250-a with the applied lower binning factor (e.g., 4×1 binning configuration).

In some cases, device 115 may determine that the confidence level is above a threshold by comparing the confidence level to the threshold. Because of the confidence level being above the threshold, device 115 may perform a contrast AF fine search to determine an adjustment to the initial lens position $D_0$. For example, the contrast AF fine search may result in device 115 adjusting a lens position from the initial lens position $D_i$ to a final lens position $D_f$, with reference to FIG. 2B. Alternatively, device 115 may determine that the binning factor is a minimum binning factor of the set of binning factors. In this case, device 115 may perform a full contrast AF coarse search to determine the initial lens position $D_i$, and then perform the contrast AF fine search to adjust the initial lens position $D_i$ to a final lens position $D_f$. In some cases, device 115 may perform a PDAF based on a timer. For example, device 115 may perform a number of PDAF operations before the timer lapses, and select a lens position that has a highest confidence level to be the final lens position for lens 275. Device 115 may capture a second frame including a second pixel array 250-b using the final lens position $D_f$. As a result, the captured second pixel array 250-b representing the scene 255-b may be in-focus.

Thereby, device 115 may initialize a binning configuration (e.g., 8×1), and check a confidence level. If the confidence level is above a threshold, device 115 may continue using the binning configuration and perform a AF fine search to reach a final lens position. Alternatively, if the confidence level is below the threshold, device 115 may configure a lesser binning configuration (e.g., 4×1). Device 115 may perform the techniques described herein in an iterative process till the confidence level is above the threshold. In the case that the binning configuration reaches a minimum binning factor (e.g., 1×1) and the confidence level remains to be below the threshold, device 115 may perform a full contrast AF coarse search to determine a lens position. As such, the described techniques herein allow device 115 to process PDAF camera sensor data, while reducing memory and power utilization related to the processing in an efficient manner.

Figure 3:
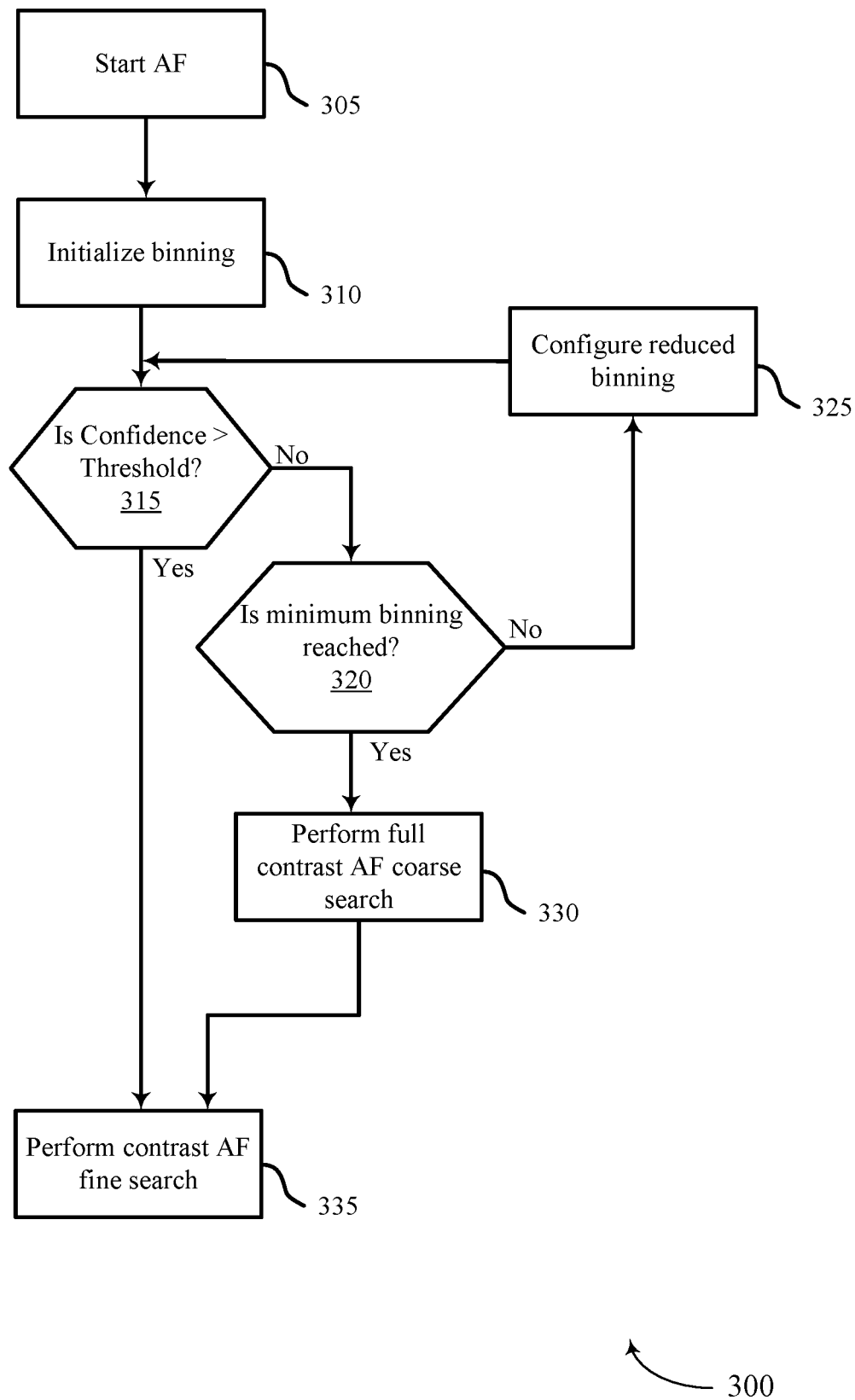

FIG. 3 illustrates an example of a method 300 that supports PDAF power optimization in accordance with various aspects of the present disclosure. In some examples, method 300 may implement aspects of system 100 and 200. The operations of method 300 may be implemented by a device 115 or its components as described herein. In some examples, device 115 may be a camera device. In some examples, a device 115 may execute a set of codes to control the functional elements of the device to perform the functions described below. Additionally, or alternatively, the device 115 may perform aspects of the functions described below using special-purpose hardware.

In the following description of the method 300, the operations may be performed in a different order than the exemplary order shown, or at different times. Certain operations may also be left out of the method 300, or other operations may be added to the method 300.

At 305, the device 115 may start an AF operation. For example, the device 115 may be a device configured with a camera operation that may capture a frame including a pixel array representing a scene. As part of the AF operation, the device 115 may determine a lens position for the device 115.

At 310, the device 115 may initialize binning. In some examples, initializing binning may include selecting a binning factor from a set of binning factors, as described herein. The device 115 may select the binning factor for processing pixels in the pixel array. The device 115 may determine the lens position for the device 115 based on processing the pixel array using the selected binning factor.

At 315, the device 115 may determine whether a confidence level associated with the determined lens position (e.g., a confidence level of the determined lens position may be calculated based on variance across both past and present estimations of the lens positions, and focus adjustment may be repeated until the variance is sufficiently low as to indicate a confidence level that a proper focus has been attained) is above or below a threshold by comparing the confidence level to the threshold. The threshold may be system defined or may be based on previous confidence levels related to past estimations of the lens positions. If the device 115 determines that the confidence level associated with the determined lens position is above the threshold, the device 115 may at 335 perform a contrast AF fine search and adjust the lens position of the device 115 based on the contrast AF fine search. Alternatively, if the device 115 determines that the confidence level associated with the determined lens position is below the threshold, the device 115 may determine at 320 whether the selected binning factor is a minimum binning factor of the set. In the case that the selected binning factor is not a minimum binning factor, the device 115 may at 325 configure a reduced binning factor and re-determine a lens position using the reduced binning factor. If, however, the selected binning factor is a minimum binning factor, the device 115 may perform at 330 a full contrast AF coarse search, and at 335 perform the contrast AF fine search.

The method 300 may initialize a binning configuration (e.g., 8×1), and check a confidence level. If the confidence level is above a threshold, device 115 may continue with using the binning configuration and perform an AF fine search to reach a final lens position. Alternatively, if the confidence level is below the threshold, device 115 may configure a reduced binning configuration (e.g., 2×1). Device 115 may perform the operations of method 300 in an iterative process until the confidence level is above the threshold. In the case that the binning configuration reaches a minimum binning factor (e.g., 1×1) and the confidence level continues to be below the threshold, device 115 may perform a full contrast AF coarse search to determine a lens position. As such, the method 300 may allow device 115 to process PDAF data in an efficient manner, while decreasing memory and power utilization related to the processing.

Figure 4:
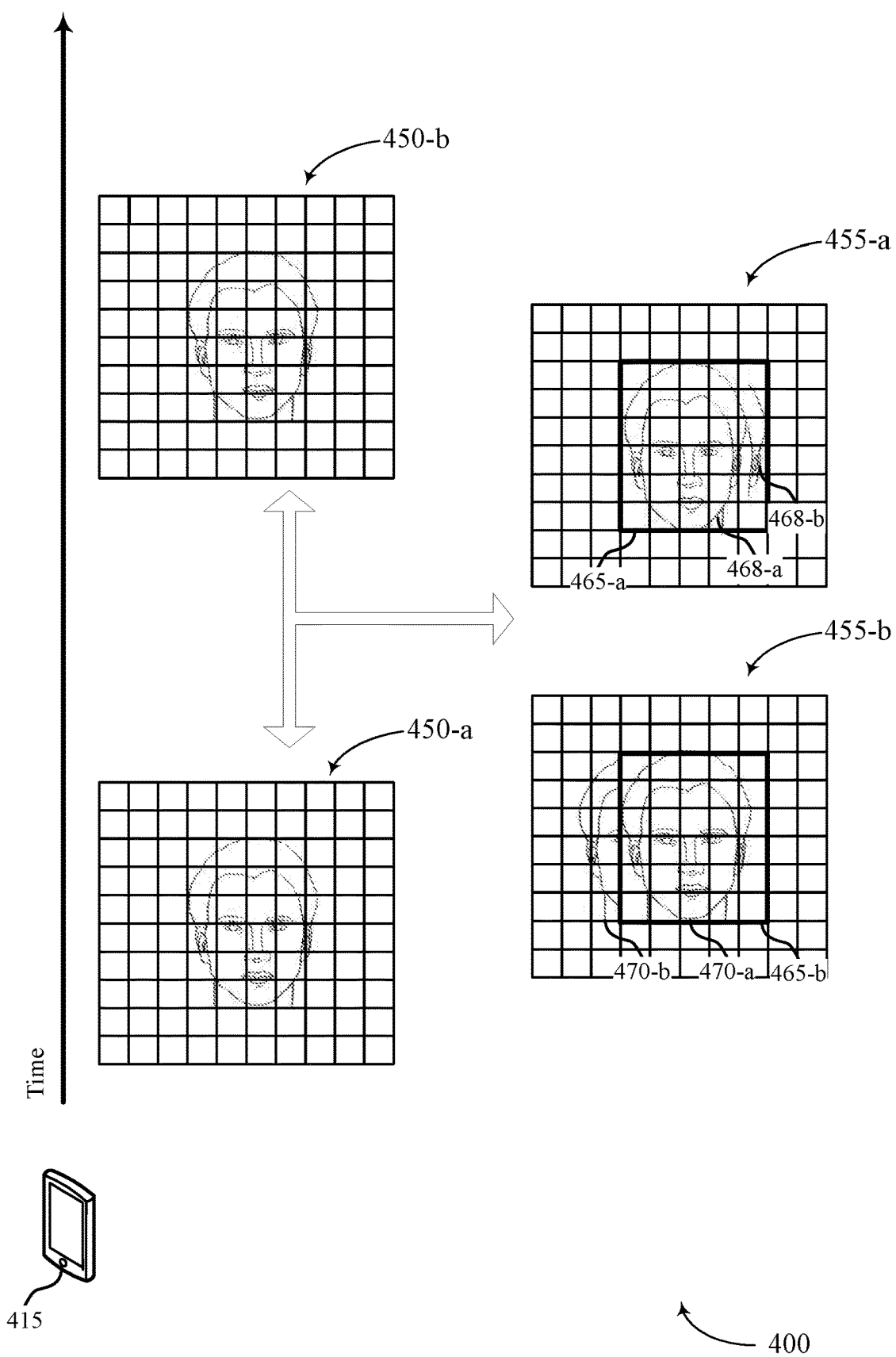
FIG. 4 illustrates an example of a method or methods that support PDAF power optimization in accordance with aspects of the present disclosure.

FIG. 4 illustrates an example of a method 400 that supports PDAF power optimization in accordance with various aspects of the present disclosure. In some examples, the method 400 may implement aspects of systems 100 through 300. Device 415 may be an example of aspects of a device 115 as described herein. Device 415 may, according to the described techniques herein, support processing sensor data (e.g., pixels, PD pixels, or PDAF data) to perform PDAF while reducing memory and power utilization of device 415.

Device 415 may identify a configuration for capturing a pixel array. In some examples, device 415 may identify the configuration prior to, during, or after capturing a pixel array. Device 415 may identify the configuration to improve power and performance for processing sensor data. In some examples, the configuration may be a binning configuration or frame pattern configuration, or both. The frame pattern configuration may include skipping one or more frames based on a preconfigured number. For example, device 415 may skip a number of frames N based on whether a scene is static or dynamic, where N is an integer.

In case of contrast AF, PDAF data may not be needed and can be disabled by using higher frame skip patterns. A scene stability can be determined from sensor data and frame correlation. Device 415 may capture two or more frames including a pixel array representing a scene, and determine whether the scene is static or dynamic based on performing frame correlation, among other operations. In some examples, if a scene is static (e.g., not changing, having variation below a threshold amount of variation), device 415 may apply a higher frame skip pattern to reduce PDAF data rate. Alternatively, if a scene is dynamic, (e.g., changing, having variation above a threshold amount of variation), device 415 may disable the frame skip pattern. The threshold amount may be a degree of change (e.g., displacement) for an object in the captured frames.

In some cases, to determine whether the scene is static or dynamic, device 415 may perform segmenting and matching when determining whether a scene is static or dynamic. Segmentation may include device 415 identifying features in the pixel array and grouping the pixels related to the identified features. If a feature (e.g., person, animal, object) appears in two or more pixel arrays (e.g., images) device 415 may determine that a scene associated with the pixel array is static. For example, device 415 may capture a first frame including a pixel array 450-*a* representing a scene, and capture a second frame including a pixel array 450-*b* representing the scene. When determining whether a scene is static or dynamic, device 415 may also capture and analyze two or more frames that are temporally separated, for example, by a preconfigured period (e.g., a number of milliseconds). For example, the first frame including pixel array 450-*a* may be captured at a first time, and the second frame including pixel array 450-*b* may be captured at a second time different from the first time. In some examples, the first time and the second time may be within a threshold amount of time (e.g., M frames apart, where M is an integer).

Device 415 may identify features in the first frame and features in the second frame based on image recognition techniques. Features may also include landscape, people, objects, among others. For example, in the pixel arrays 450-*a* and 450-*b*, a feature may be a person. Device 415 may perform static scene analysis on the pixel arrays 450-*a* and 450-*b* to segment or partially segment each frame. Device may perform matching to determine correspondences and detect variation in the location of a feature across multiple pixel arrays (e.g., images, frames, pixels). For example, device 415 may detect a displacement of the feature associated with the pixel arrays 450-*a* and 450-*b*, and determine whether a scene represented in pixel arrays 450-*a* and 450-*b* is static or dynamic.

In some cases, device 415 may apply a threshold when determining whether a scene is static or dynamic. For example, device 415 may determine that a scene is static based on an analysis of a feature in a correlated pixel array 455-*a*. The correlated pixel array 455-*a* may be a combination of two or more pixel arrays (e.g., pixel array 450-*a* and pixel array 450-*b*). Device 415 may determine that the scene is static based on determining that a displacement of the feature in the correlated pixel array 455-*a* is below a threshold, and enable a frame pattern configuration. For example, feature 468-*b* associated with pixel array 450-*b* may be displaced below a threshold displacement from feature 468-*a* associated with pixel array 450-*b*. As such, device 415 may determine that the scene is static and enable a frame pattern configuration (e.g., skip a number of frames, skip every M frame where M is an integer). Alternatively, device 415 may determine that the scene is dynamic based on determining that a displacement of the feature in correlated pixel array 455-*b* is above a threshold. For example, feature 470-*b* associated with pixel array 450-*b* may be displaced above a threshold displacement from feature 470-*a* associated with pixel array 450-*a*. Thereby, device 415 may determine that the scene is dynamic and disable a frame pattern configuration based on determining that the scene is dynamic.

In some cases, a threshold may correspond to a boundary 465 configured around an identified feature in a pixel array. As a result, if a feature is detected to be located outside the boundary (e.g., 465-*b*), device 415 may determine that a scene is dynamic. Segmenting a pixel array may also include identifying regions, corners, edges, or other features in the frames. Device 415 may then match consecutive frames to detect any displacement relative to the identified regions, corners, edges, or other features.

Device 415 may, additionally or alternatively, determine whether a scene is static or dynamic based on scene classification. For example, device 415 may store in memory a number of pixel arrays (e.g., images) displaying different scenes. Some examples of different scenes may include sunset, landscapes, social scenes, etc. In some cases, device 415 may apply and perform convolutional neural networks, deep learning, or machine learning techniques (e.g., support vector machines, decision trees, Naïve Bayes classification, ordinary least squares regression, logistic regression), or any combination thereof to determine whether a scene is static or dynamic. When device 415 captures a new pixel array, it may compare the newly captured pixel array to a database including a number of pixel arrays associated with different scenes. The database may be a local memory in device 415 or a remote memory. In some examples, comparing the pixel arrays may include identifying similar and different features in the pixel arrays.

Alternatively, device 415 may trigger to receive location information (e.g., GPS coordinates) based on a request related to an application (e.g., a request to launch a camera application) on device 415, in an example case where device 415 is a mobile device. In another example, device 415 may be a standalone camera, and based on powering ON may trigger to receive location information. Based on receiving the location information, device 415 may determine nearby points of interest (POI) and determine a scene classifier based on the POI. In this case, device 415 may filter pixel arrays in the database that may not relate to the POI. For example, a POI may be a restaurant, device 415 may filter pixel arrays that are not classified under a food category or social scene category. As such, when device 415 captures a new pixel array, device 415 may compare the newly captured pixel array to pixel arrays having a category related to the POIs within a geo-boundary of device 415.

Additionally, or alternatively, device 415 may determine whether a scene is static or dynamic based on timing information for example, when a captured pixel array was taken. In some cases, device 415 may prioritize comparison of different pixel arrays in the database to the newly captured pixel array based on scene classification. Device 415 may, additionally or alternatively, determine whether a scene is static or dynamic based on whether a field of view of device 415 is in a landscape mode or portrait mode. In an example of landscape mode, device 415 may apply higher frame skip pattern. Alternatively, in an example of portrait mode, device 415 may apply no frame skip pattern.

Figure 5:
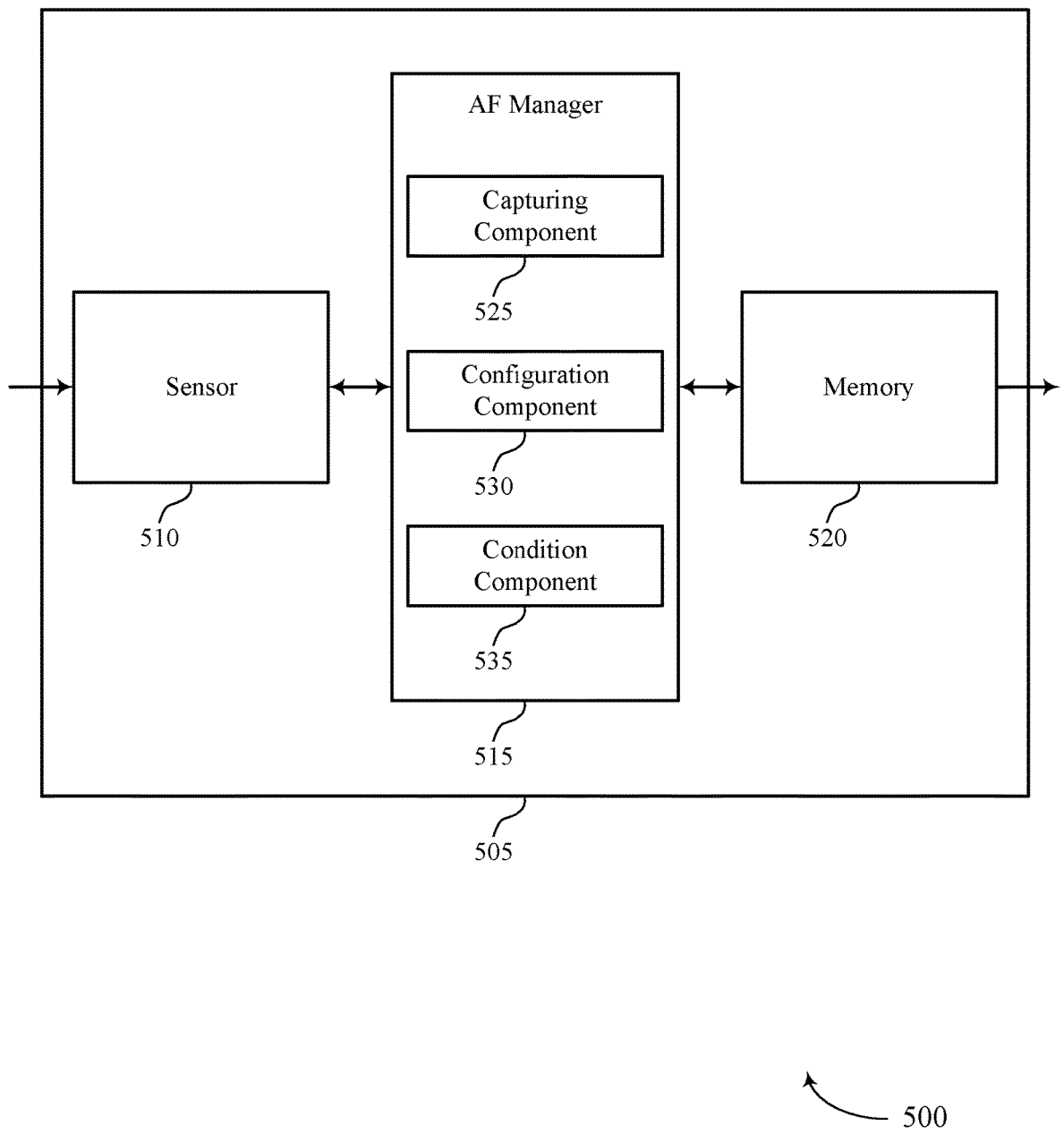
FIG. 5 illustrates an example of a device that supports PDAF power optimization in accordance with aspects of the present disclosure.

FIG. 5 shows a block diagram 500 of a wireless device 505 that supports PDAF power optimization in accordance with aspects of the present disclosure. Wireless device 505 may be an example of aspects of a device 115 as described herein. Wireless device 505 may include sensor 510, AF manager 515, and memory 520. Wireless device 505 may also include a processor. Each of these components may be in communication with one another (e.g., via one or more buses).

Sensor 510 may receive information such as packets, user data, or control information associated with various information channels (e.g., control channels, data channels, and information related to dual PDAF power optimization, etc.). Information may be passed on to other components of the device. Sensor 510 may be an example of an image sensor for capturing images. For example, sensor 510 may represent a camera operable to capture an image of a scene that may be processed by AF manager 515 alone according to aspects of the present disclosure. In another example, sensor 510 may be a dual PDAF sensor, an optical depth sensor (e.g., for determining or estimating a depth of an object or scene with respect to device 505), a lux sensor (e.g., for detecting an illumination condition, luminance levels), a motion sensor (e.g., for detecting motion associated with the scene), an infrared heat sensor (e.g., for detecting humans and animals vs. objects in the scene), among others. Sensor 510 may also be configured with multiple functionalities.

For example, a single sensor 510 may be capable to perform operations related to the image sensor, the PDAF sensor, the optical depth sensor, the motion sensor, or the lux sensor, or any combination thereof. Sensor 510 may, in some cases, be a charge coupled device (CCD) sensor or a complementary metal-oxide semiconductor (CMOS) sensor.

AF manager 515 may be an example of aspects of the AF manager 715 described with reference to FIG. 7. AF manager 515 and/or at least some of its various sub-components may be implemented in hardware, software executed by a processor, firmware, or any combination thereof. If implemented in software executed by a processor, the functions of the AF manager 515 and/or at least some of its various sub-components may be executed by a general-purpose processor, an intelligent hardware device, (e.g., a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof) or other programmable logic device, discrete gate or transistor logic, discrete hardware components, or any combination thereof designed to perform the functions described in the present disclosure.

The AF manager 515 and/or at least some of its various sub-components may be a separate and distinct component in accordance with various aspects of the present disclosure. In other examples, AF manager 515 and/or at least some of its various sub-components may be combined with one or more other hardware components, including but not limited to an I/O component, a lens, an actuator, a sensor, another computing device, one or more other components described in the present disclosure, or a combination thereof in accordance with various aspects of the present disclosure.

AF manager 515 may be an example of aspects of the AF manager 715 described with reference to FIG. 7. AF manager 515 may also include capturing component 525, configuration component 530, and condition component 535.

Capturing component 525 may capture, by a sensor of the device 505, a frame including a pixel array representing a scene, capture a second frame including a second pixel array using a lens position based on determining that a confidence level associated with the lens position is above the threshold, where capturing the frame is based on an initial lens position that is different from the lens position, In some cases, each pixel of the pixel array includes a PD pixel having one or more values, or one or more PD pixels positioned randomly across the pixel array.

Configuration component 530 may identify a configuration of the captured pixel array, determine a reconfiguration to be applied to the captured pixel array based on determining the at least one condition of the captured pixel array, and apply the reconfiguration to at least a portion of the captured pixel array. Condition component 535 may determine the at least one condition of the captured pixel array relative to the configuration.

Memory 520 may include random access memory (RAM) and read only memory (ROM). The memory 520 may, additionally or alternatively, include static RAM (SRAM), dynamic RAM (DRAM), electrically erasable programmable read-only memory (EEPROM), compact disk-ROM (CD-ROM) or other optical disc storage, magnetic disc storage, or other magnetic storage devices, flash memory, or any other medium that can be used to store desired program code in the form of instructions or data structures and that can be accessed by a computer or a processor.

The memory 520 may store computer-readable, computer-executable software including instructions that, when executed, cause the processor to perform various functions described herein. Memory 520 may store image data, pixel array, configuration information (e.g., binning configuration, frame pattern configuration), lens position, among other information. In some cases, the memory 520 may contain, among other things, a basic input/output system (BIOS) which may control basic hardware or software operation such as the interaction with peripheral components or devices.

As detailed above, AF manager 515 and/or one or more components of the AF manager 515 may perform and/or be a means for performing, either alone or in combination with other elements, one or more operations for PDAF power optimization.

Figure 6:
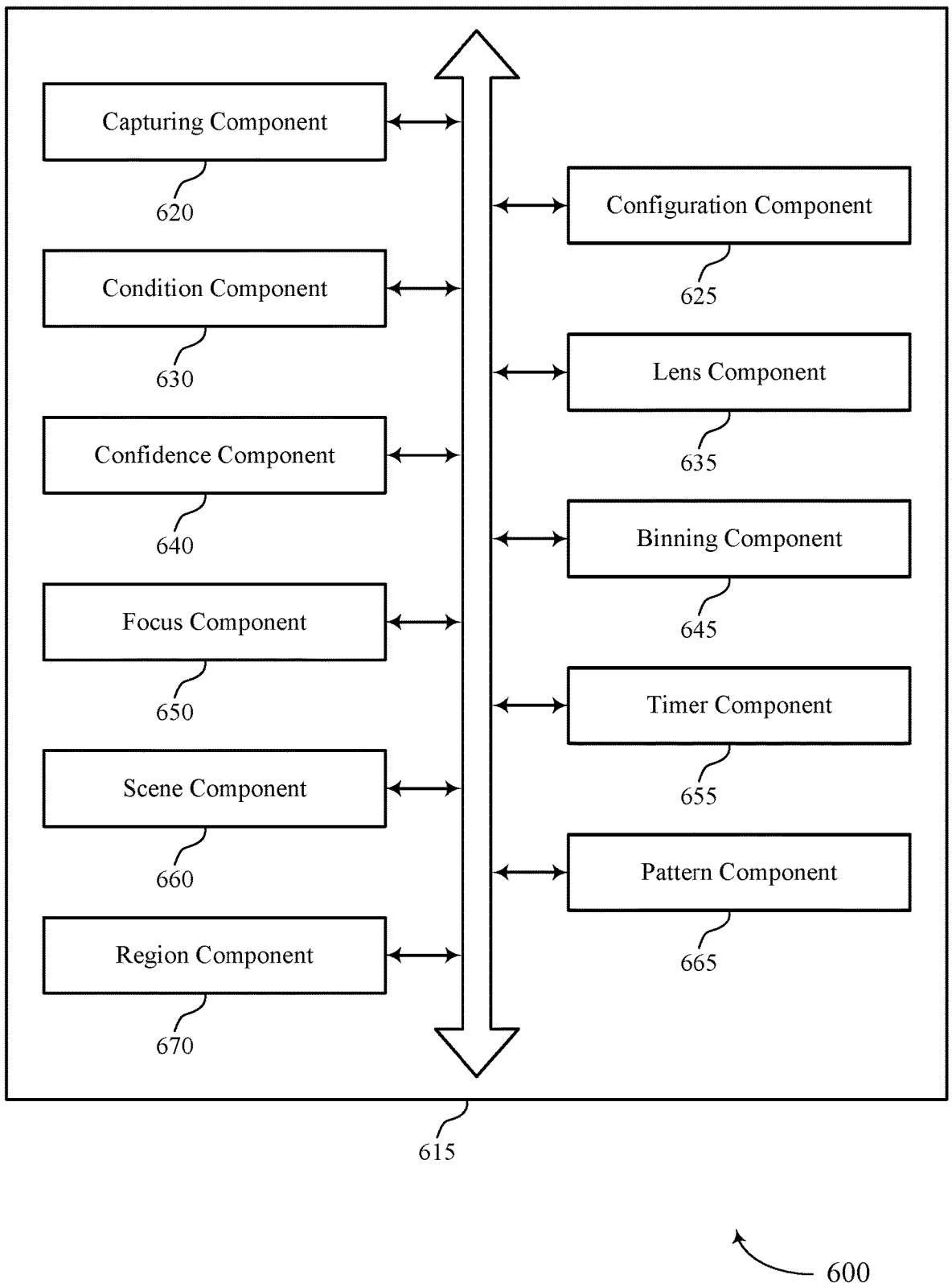
FIGS. 6 through 8 show block diagrams of a device that supports PDAF power optimization in accordance with aspects of the present disclosure.

FIG. 6 shows a block diagram 600 of an AF manager 615 that supports PDAF power optimization in accordance with aspects of the present disclosure. The AF manager 615 may be an example of aspects an AF manager 515 or an AF manager 715 described with reference to FIGS. 5 and 7. The AF manager 615 may include capturing component 620, configuration component 625, condition component 630, lens component 635, confidence component 640, binning component 645, focus component 650, timer component 655, scene component 660, pattern component 665, and region component 670. Each of these modules may communicate, directly or indirectly, with one another (e.g., via one or more buses).

Capturing component 620 may capture, by a sensor of a camera device, a frame including a pixel array representing a scene. Capturing component 620 may capture a second frame including a second pixel array using the lens position based on determining that a confidence level associated with a lens position is above a threshold. In some examples, capturing the frame is based on an initial lens position that is different from the lens position. Capturing component 620 may capture a second frame including a second pixel array representing the scene based on adjusting the lens position. Capturing component 620 may capture, by the sensor of the camera device, a second frame including a second pixel array. In some cases, each pixel of the pixel array includes a PD pixel having one or more values, or one or more PD pixels positioned randomly across the pixel array.

Configuration component 625 may identify a configuration of the captured pixel array. Configuration component 625 may determine a reconfiguration to be applied to the captured pixel array based on determining at least one condition of the captured pixel array, and apply the reconfiguration to at least a portion of the captured pixel array. Condition component 630 may determine the at least one condition of the captured pixel array relative to the configuration.

Lens component 635 may determine a lens position for the camera device based on applying the reconfiguration. Lens component 635 may determine a lens position of the camera device based on a binning factor. Lens component 635 may adjust the lens position of the camera device based on a contrast AF fine search. Lens component 635 may re-determine the lens position using a different binning factor from a set of binning factors after an expiration of a timer. In some examples, determining the reconfiguration to be applied to the captured pixel array is based on re-determining the lens position. Lens component 635 may determine the lens position of the camera device based on applying a second binning factor. Lens component 635 may determine the lens position of the camera device based on a full contrast AF coarse search.

Confidence component 640 may determine that a confidence level associated with the lens position is above the threshold by comparing the confidence level to the threshold. Confidence component 640 may determine a confidence level of an autofocus associated with the determined lens position based on the binning factor, where determining the reconfiguration to be applied to the captured pixel array is based on determining the confidence level. Confidence component 640 may determine that the confidence level is above a threshold by comparing the confidence level to the threshold, or determine that the confidence level is below a threshold by comparing the confidence level to the threshold.

Binning component 645 may initialize the binning factor associated with a binning configuration based on a preconfigured parameter of the sensor. The binning configuration including a set of binning factors. Binning component 645 may apply the binning factor to the pixel array, where identifying the configuration of the captured pixel array is based on applying the binning factor to the pixel array. Binning component 645 may determine whether the binning factor is a minimum binning factor of the set of binning factors. Binning component 645 may determine a lower binning factor associated the set of binning factors based on an illumination condition, where applying the reconfiguration to at least the portion of the captured pixel array is based on determining the lower binning factor. Binning component 645 may determine a second binning factor of the set of binning factors based on determining whether the binning factor is the minimum binning factor of the set of binning factors, where the second binning factor is different from the minimum binning factor of the set of binning factors. Binning component 645 may determine the reconfiguration to be applied to the captured pixel array based on determining the second binning factor, where applying the reconfiguration to at least the portion of the captured pixel array includes applying the second binning factor.

Focus component 650 may perform a contrast AF fine search based on the confidence level being above the threshold, or perform a full contrast AF coarse search based on determining that the binning factor is the minimum binning factor of the set of binning factors, and perform a contrast AF fine search based on determining the lens position.

Timer component 655 may initialize a timer based on the confidence level being below the threshold. Scene component 660 may determine that the scene is static based on sensor data, a correlation of the frame with the second frame, or both or determine that the scene is dynamic based on sensor data, a correlation of the frame with the second frame, or both.

Pattern component 665 may disable a frame pattern configuration associated with the captured second frame based on the scene being static, where identifying the configuration of the captured pixel array is based on disabling the frame pattern configuration. Pattern component 665 may enable a frame pattern configuration associated with the captured second frame based on the scene being dynamic, where enabling the frame pattern configuration includes skipping one or more frames based on a preconfigured number.

Region component 670 may determine, by the sensor of the camera device, a ROI associated with the pixel array representing the scene, where determining the at least one condition of the captured pixel array relative to the configuration is based on the determined ROI. Region component 670 may configure the region of the pixel array to the ROI based on skipping pixels outside the ROI, where determining the reconfiguration to be applied to the captured pixel array is based on configuring the region of the pixel array to the ROI.

As detailed above, AF manager 615 and/or one or more components of the AF manager 615 may perform and/or be a means for performing, either alone or in combination with other elements, one or more operations for PDAF power optimization.

Figure 7:
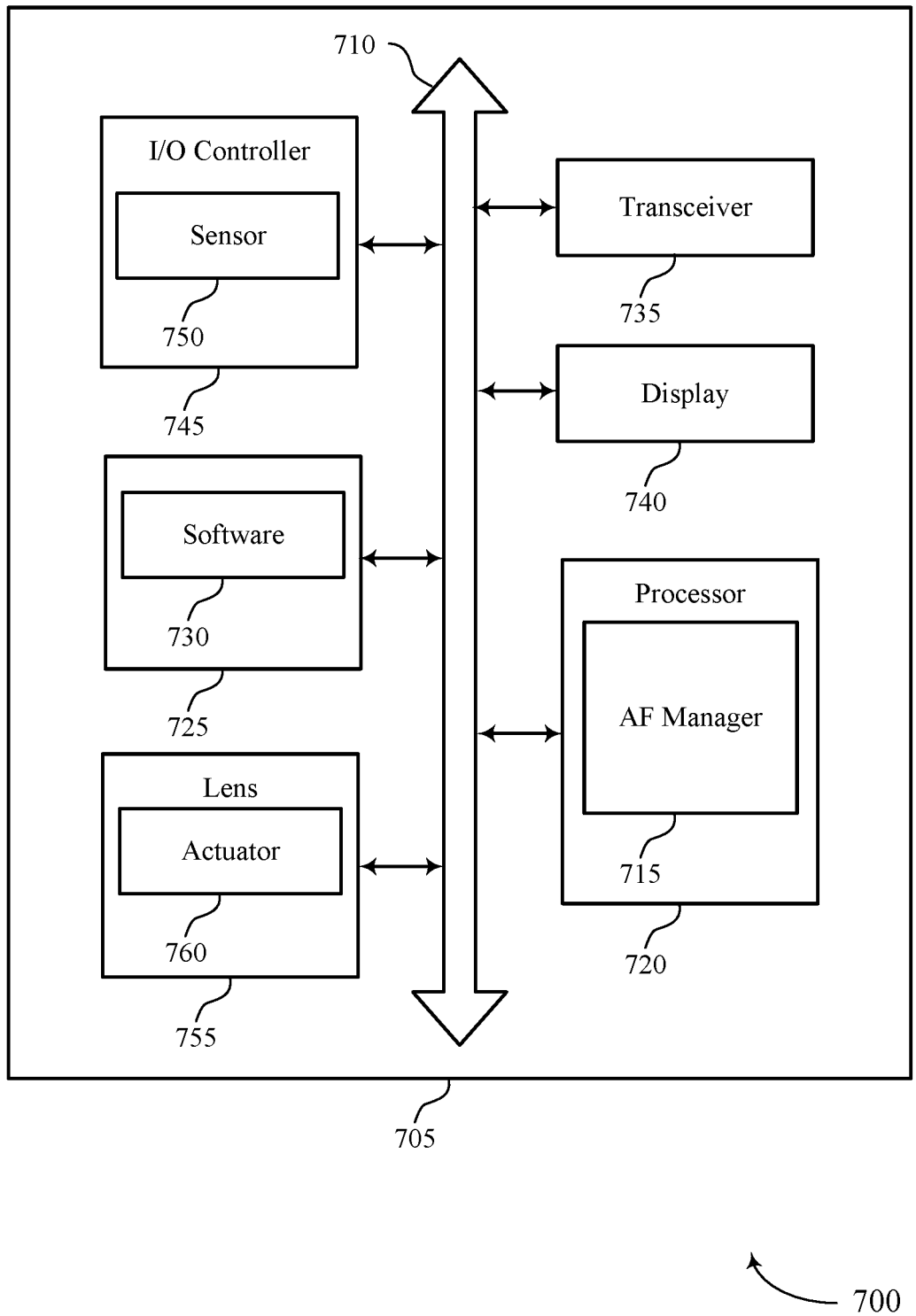

FIG. 7 shows a diagram of a system 700 including a device 705 that supports phase detection auto focus power optimization in accordance with aspects of the present disclosure. Device 705 may be an example of or include the components of wireless device 505 or a device 115 as described above, for example, with reference to FIG. 5. Device 705 may include components for bi-directional data communications including components for transmitting and receiving communications, including AF manager 715, processor 720, memory 725, software 730, transceiver 735, display 740, I/O controller 740, sensor 750, lens 755, and actuator 760. These components may be in electronic communication via one or more buses (e.g., bus 710). AF manager 715 may, alone or in combination, with processor 720, memory 725, software 730, transceiver 735, display 740, I/O controller 740, sensor 750, lens 755, or actuator 760, or any combination thereof, to perform dual PDAF power optimization.

Processor 720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In other cases, a memory controller may be integrated into processor 720. Processor 720 may be configured to execute computer-readable instructions stored in a memory to perform various functions (e.g., functions or tasks supporting dual phase detection auto focus power optimization).

Processor 720 may be configured to perform various processing operations on image data in order to execute AF and image processing techniques. Processor 720 may include one or more ISPs. In some examples, the ISP may be electrically coupled or connected to a camera of device 705. Processor 720 may be configured for image processing. In some examples, processor 720 may perform image enhancements, image restoration, image analysis, image compression, and image synthesis. For example, processor 720 may perform white balancing, cropping, scaling (e.g., image compression), adjusting a resolution, image stitching, image format conversion, color processing, image filtering, spatial image filtering, artifact removal, among others. Processor 720 may also be configured to control image capturing parameters such as auto-focus and auto-exposure.

Memory 725 may include RAM and ROM. The memory 725 may, additionally or alternatively, include SRAM, DRAM, EEPROM, CD-ROM or other optical disc storage, magnetic disc storage, or other magnetic storage devices, flash memory, or any other medium that can be used to store desired program code in the form of instructions or data structures and that can be accessed by a computer or a processor.

The memory 725 may store computer-readable, computer-executable software 730 including instructions that, when executed, cause the processor to perform various functions described herein. The memory 725 may store image data, pixel array, configuration information (e.g., binning configuration, frame pattern configuration), lens position, among other information. In some cases, the memory 725 may contain, among other things, a BIOS which may control basic hardware or software operation such as the interaction with peripheral components or devices.

Software 730 may include code to implement aspects of the present disclosure, including code to support dual PDAF power optimization. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the device 705 may include a single antenna. However, in some cases the device 705 may have more than one antenna, which may be capable of concurrently transmitting or receiving multiple wireless transmissions. For example, device 705 may communicate image data to server 105, or database 110, or another device (e.g., UE).

Display 740 represents a unit capable of displaying video, images, text or any other type of data for consumption by a viewer. Display 740 may include a liquid-crystal display (LCD), a LED display, an organic LED (OLED), an active-matrix OLED (AMOLED), or the like. In some cases, display 740 and I/O controller 745 may be or represent aspects of a same component (e.g., a touchscreen) of device 705. Display 740 may be configured to display images captured via lens 755 and sensor 750 may be configured to provide configuration functions of device 705. In some cases, display 740 may be configured to display one or more regions of a captured image selected by an individual, via an input (e.g., touch, gesture). In some examples, display 740 may provide a means for an individual to select or designate a ROI.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

In some cases, I/O controller 745 may be or include sensor 750. Sensor 750 may be an example of an image sensor for capturing photos and video. For example, sensor 750 may represent a camera operable to capture an image of a scene that may be processed by AF manager 915 alone or in combination with processor 720 according to aspects of the present disclosure. In another example, sensor 750 may be a dual PDAF sensor, an optical depth sensor, a lux sensor, a motion sensor, an infrared heat sensor, among others. In some examples, the device 705 may include more than one sensor. For example, the device 705 may have a dual PDAF sensor and a lux sensor, or a dual PDAF sensor, lux sensor, and motion sensor. Sensor 750 may also be configured with multiple functionalities. For example, a single sensor 750 may be capable to perform operations related to the image sensor, the PDAF sensor, the optical depth sensor, the motion sensor, or the light sensor, or any combination thereof. Sensor 750 may be a CCD sensor or a CMOS sensor.

Lens 755 may be coupled to actuator 760 and may be moved by actuator 760 to adjust a lens position of lens 755. Actuator 760 may be a micro-electronic mechanical system (MEMS) actuator, an open-loop voice coil motor (VCM) actuator, or a closed-loop VCM. The movement of lens 755 may affect a focus of a captured image. For example, movement of lens 755 with respect to an image sensor (e.g., sensor 750) may control a focus of an image. In some cases, actuator 760 may be configured to move lens 755 in a sequence of one or more lens movement during an AF operation, for example, adjusting a lens position to change a focus of an image. In some cases, lens 755 may have a boundary on a degree of freedom, for example, a movement range d in which actuator 760 may move lens 755. For example, the movement range may have a minimum position $d_{min}$ and a maximum position $d_{max}$.

As detailed above, system 700 and/or one or more components of the system 700 may perform and/or be a means for performing, either alone or in combination with other elements, one or more operations for PDAF power optimization.

Figure 8:
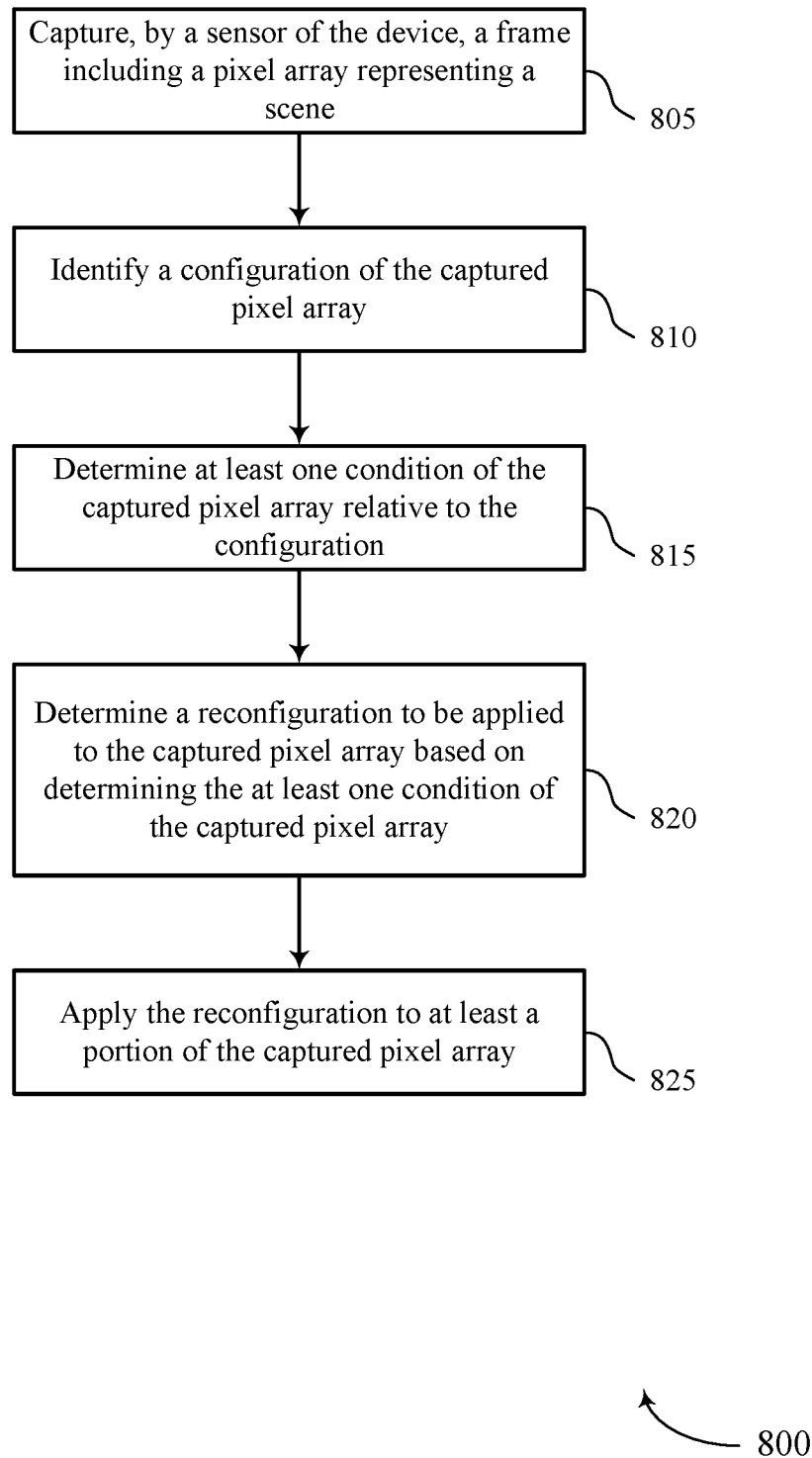

FIG. 8 shows a flowchart illustrating a method 800 for PDAF power optimization in accordance with aspects of the present disclosure. The operations of method 800 may be implemented by a device 115 or its components as described herein. For example, the operations of method 800 may be performed by an AF manager as described with reference to FIGS. 5 through 7. In some examples, a device 115 may execute a set of codes to control the functional elements of the device to perform the functions described below. Additionally, or alternatively, the device 115 may perform aspects of the functions described below using special-purpose hardware.

At 805 the device 115 may capture, by a sensor of the device 115, a frame including a pixel array representing a scene. The operations of 805 may be performed according to the methods described herein. In certain examples, aspects of the operations of 805 may be performed by a capturing component as described with reference to FIGS. 5 through 7.

At 810 the device 115 may identify a configuration of the captured pixel array. The operations of 810 may be performed according to the methods described herein. In certain examples, aspects of the operations of 810 may be performed by a configuration component as described with reference to FIGS. 5 through 7.

At 815 the device 115 may determine at least one condition of the captured pixel array relative to the configuration. The operations of 815 may be performed according to the methods described herein. In certain examples, aspects of the operations of 815 may be performed by a condition component as described with reference to FIGS. 5 through 7.

At 820 the device 115 may determine a reconfiguration to be applied to the captured pixel array based on determining the at least one condition of the captured pixel array. The operations of 820 may be performed according to the methods described herein. In certain examples, aspects of the operations of 820 may be performed by a configuration component as described with reference to FIGS. 5 through 7.

At 825 the device 115 may apply the reconfiguration to at least a portion of the captured pixel array. The operations of 825 may be performed according to the methods described herein. In certain examples, aspects of the operations of 825 may be performed by a configuration component as described with reference to FIGS. 5 through 7.

Figure 9:
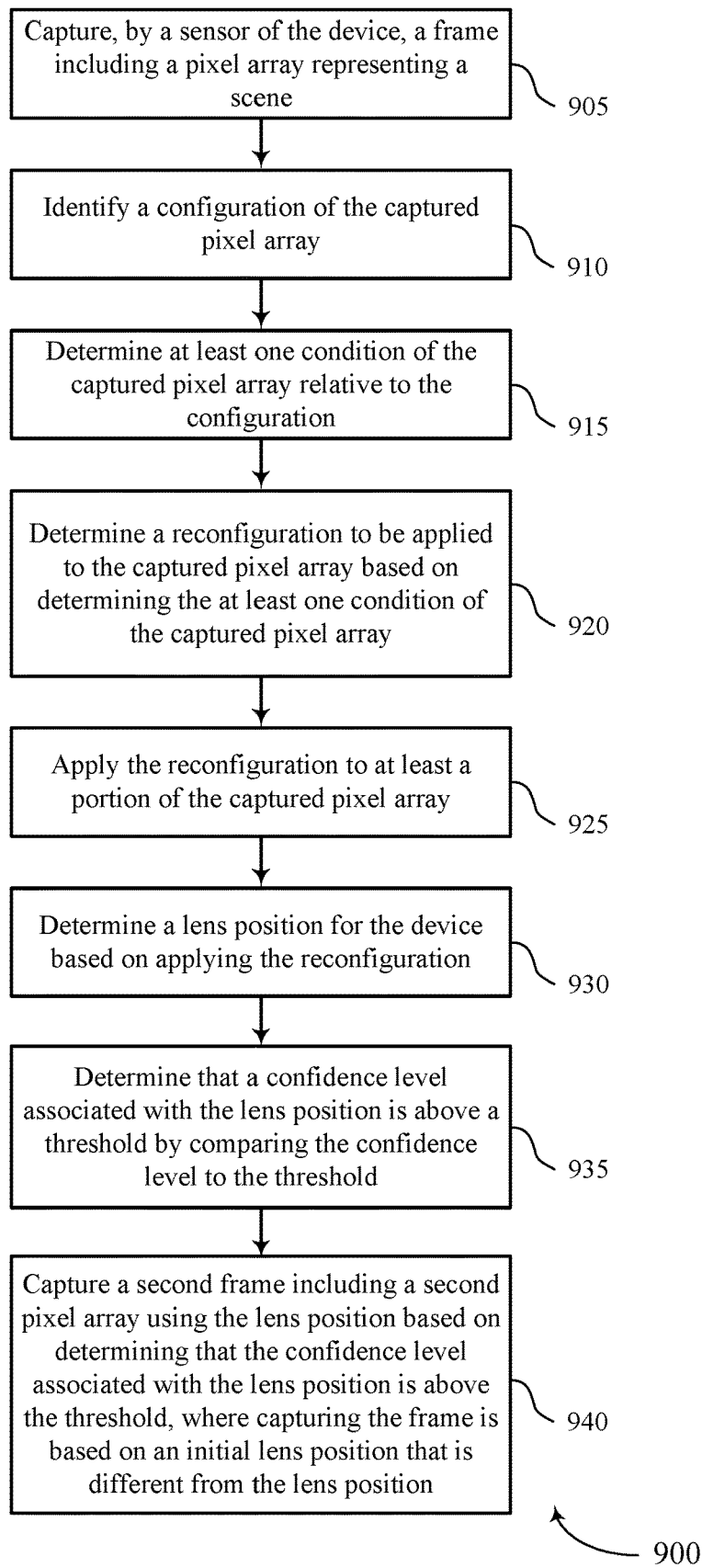
FIG. 9 illustrates a block diagram of a system including a device that supports PDAF power optimization in accordance with aspects of the present disclosure.

FIG. 9 shows a flowchart illustrating a method 900 for PDAF power optimization in accordance with aspects of the present disclosure. The operations of method 900 may be implemented by a device 115 or its components as described herein. For example, the operations of method 900 may be performed by an AF manager as described with reference to FIGS. 5 through 7. In some examples, a device 115 may execute a set of codes to control the functional elements of the device to perform the functions described below. Additionally, or alternatively, the device 115 may perform aspects of the functions described below using special-purpose hardware.

At 905 the device 115 may capture, by a sensor of the device 115, a frame including a pixel array representing a scene. The operations of 905 may be performed according to the methods described herein. In certain examples, aspects of the operations of 905 may be performed by a capturing component as described with reference to FIGS. 5 through 7.

At 910 the device 115 may identify a configuration of the captured pixel array. The operations of 910 may be performed according to the methods described herein. In certain examples, aspects of the operations of 910 may be performed by a configuration component as described with reference to FIGS. 5 through 7.

At 915 the device 115 may determine at least one condition of the captured pixel array relative to the configuration. The operations of 915 may be performed according to the methods described herein. In certain examples, aspects of the operations of 915 may be performed by a condition component as described with reference to FIGS. 5 through 7.

At 920 the device 115 may determine a reconfiguration to be applied to the captured pixel array based on determining the at least one condition of the captured pixel array. The operations of 920 may be performed according to the methods described herein. In certain examples, aspects of the operations of 920 may be performed by a configuration component as described with reference to FIGS. 5 through 7.

At 925 the device 115 may apply the reconfiguration to at least a portion of the captured pixel array. The operations of 925 may be performed according to the methods described herein. In certain examples, aspects of the operations of 925 may be performed by a configuration component as described with reference to FIGS. 5 through 7.

At 930 the device 115 may determine a lens position for the camera device based on applying the reconfiguration. The operations of 930 may be performed according to the methods described herein. In certain examples, aspects of the operations of 930 may be performed by a lens component as described with reference to FIGS. 5 through 7.

At 935 the device 115 may determine that a confidence level associated with the lens position is above a threshold by comparing the confidence level to the threshold. The operations of 935 may be performed according to the methods described herein. In certain examples, aspects of the operations of 935 may be performed by a confidence component as described with reference to FIGS. 5 through 7.

At 940 the device 115 may capture a second frame including a second pixel array using the lens position based on determining that the confidence level associated with the lens position is above the threshold, wherein capturing the frame is based on an initial lens position that is different from the lens position. The operations of 940 may be performed according to the methods described herein. In certain examples, aspects of the operations of 940 may be performed by a capturing component as described with reference to FIGS. 5 through 7.

Figure 10:
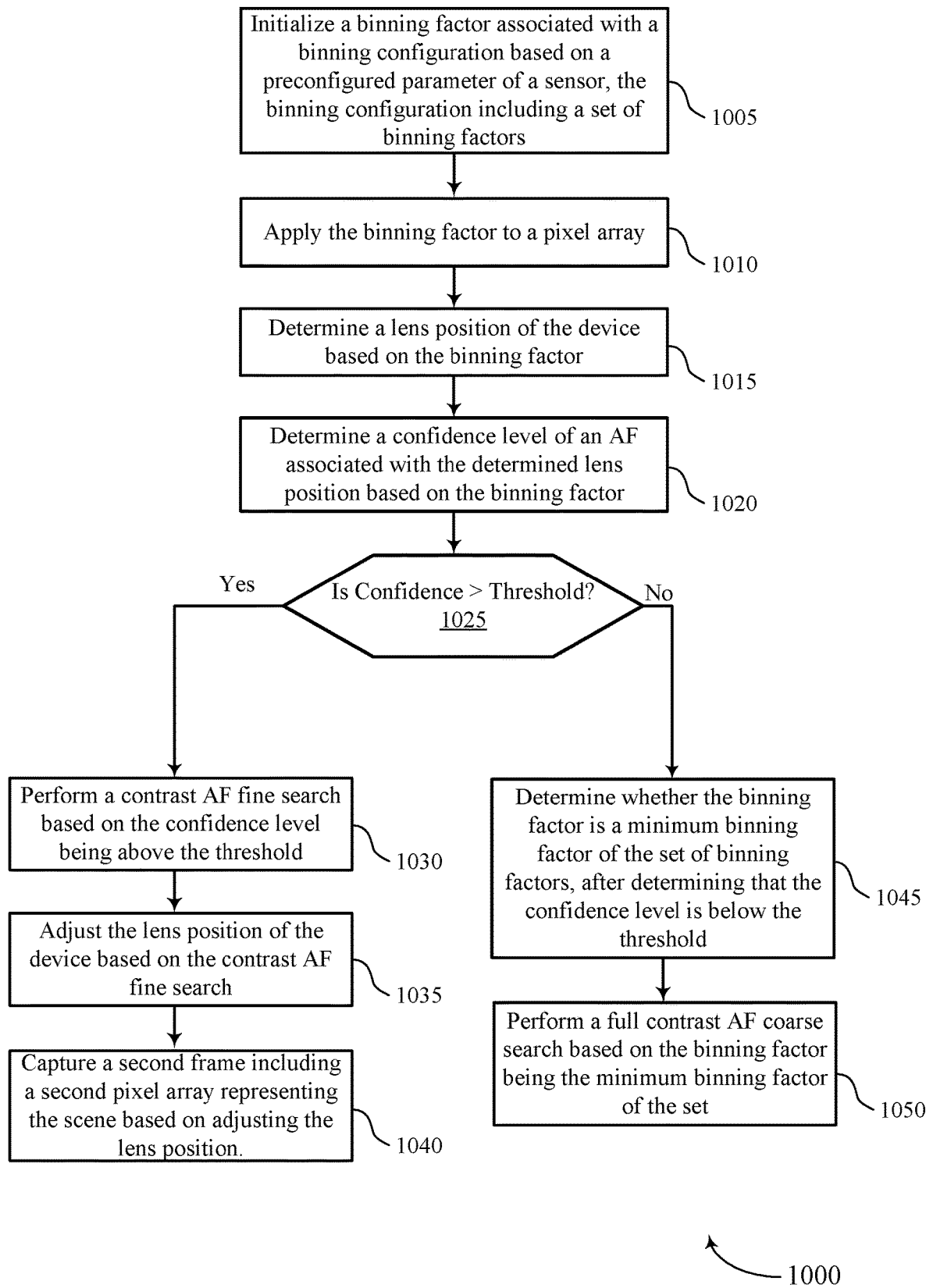
FIGS. 10 and 11 illustrate methods for PDAF power optimization in accordance with aspects of the present disclosure.

FIG. 10 shows a flowchart illustrating a method 1000 for PDAF power optimization in accordance with aspects of the present disclosure. The operations of method 1000 may be implemented by a device 115 or its components as described herein. For example, the operations of method 1000 may be performed by an AF manager as described with reference to FIGS. 5 through 7. In some examples, a device 115 may execute a set of codes to control the functional elements of the device to perform the functions described below. Additionally, or alternatively, the device 115 may perform aspects of the functions described below using special-purpose hardware.

At 1005 the device 115 may initialize a binning factor associated with a binning configuration based on a preconfigured parameter of a sensor, the binning configuration including a set of binning factors. In some examples, the device 115 may be configured with the sensor. In some cases, the sensor may operate and possess functionalities as described herein. The operations of 1005 may be performed according to the methods described herein. In certain examples, aspects of the operations of 1005 may be performed by a binning component as described with reference to FIGS. 5 through 7.

At 1010 the device 115 may apply the binning factor to the pixel array. The operations of 1010 may be performed according to the methods described herein. In certain examples, aspects of the operations of 1010 may be performed by a binning component as described with reference to FIGS. 5 through 7.

At 1015 the device 115 may determine a lens position of the camera device based on the binning factor. The operations of 1015 may be performed according to the methods described herein. In certain examples, aspects of the operations of 1015 may be performed by a lens component as described with reference to FIGS. 5 through 7.

At 1020 the device 115 may determine a confidence level of an AF associated with the determined lens position based on the binning factor. The operations of 1020 may be performed according to the methods described herein. In certain examples, aspects of the operations of 1020 may be performed by a confidence component as described with reference to FIGS. 5 through 7.

At 1025 the device 115 may determine whether the confidence level is above or below a threshold by comparing the confidence level to the threshold. The operations of 1025 may be performed according to the methods described herein. In certain examples, aspects of the operations of 1025 may be performed by a confidence component as described with reference to FIGS. 5 through 7.

At 1030 the device 115 may perform a contrast AF fine search based on the confidence level being above the threshold. The operations of 1030 may be performed according to the methods described herein. In certain examples, aspects of the operations of 1030 may be performed by an AF component as described with reference to FIGS. 5 through 7.

At 1035 the device 115 may adjust the lens position of the camera device based on the contrast AF fine search. The operations of 1035 may be performed according to the methods described herein. In certain examples, aspects of the operations of 1035 may be performed by a lens component as described with reference to FIGS. 5 through 7.

At 1040 the device 115 may capture a second frame including a second pixel array representing the scene based on adjusting the lens position. The operations of 1040 may be performed according to the methods described herein. In certain examples, aspects of the operations of 1040 may be performed by a capturing component as described with reference to FIGS. 5 through 7.

At 1045 the device 115 may, alternatively, determine whether the binning factor is a minimum binning factor of the set of binning factors, after determining that the confidence level is below the threshold. The operations of 1045 may be performed according to the methods described herein. In certain examples, aspects of the operations of 1045 may be performed by a binning component as described with reference to FIGS. 5 through 7.

At 1050 the device 115 may perform a full contrast AF coarse search based on the binning factor being the minimum binning factor of the set. The operations of 1050 may be performed according to the methods described herein. In certain examples, aspects of the operations of 1050 may be performed by a binning component as described with reference to FIGS. 5 through 7.

Figure 11:
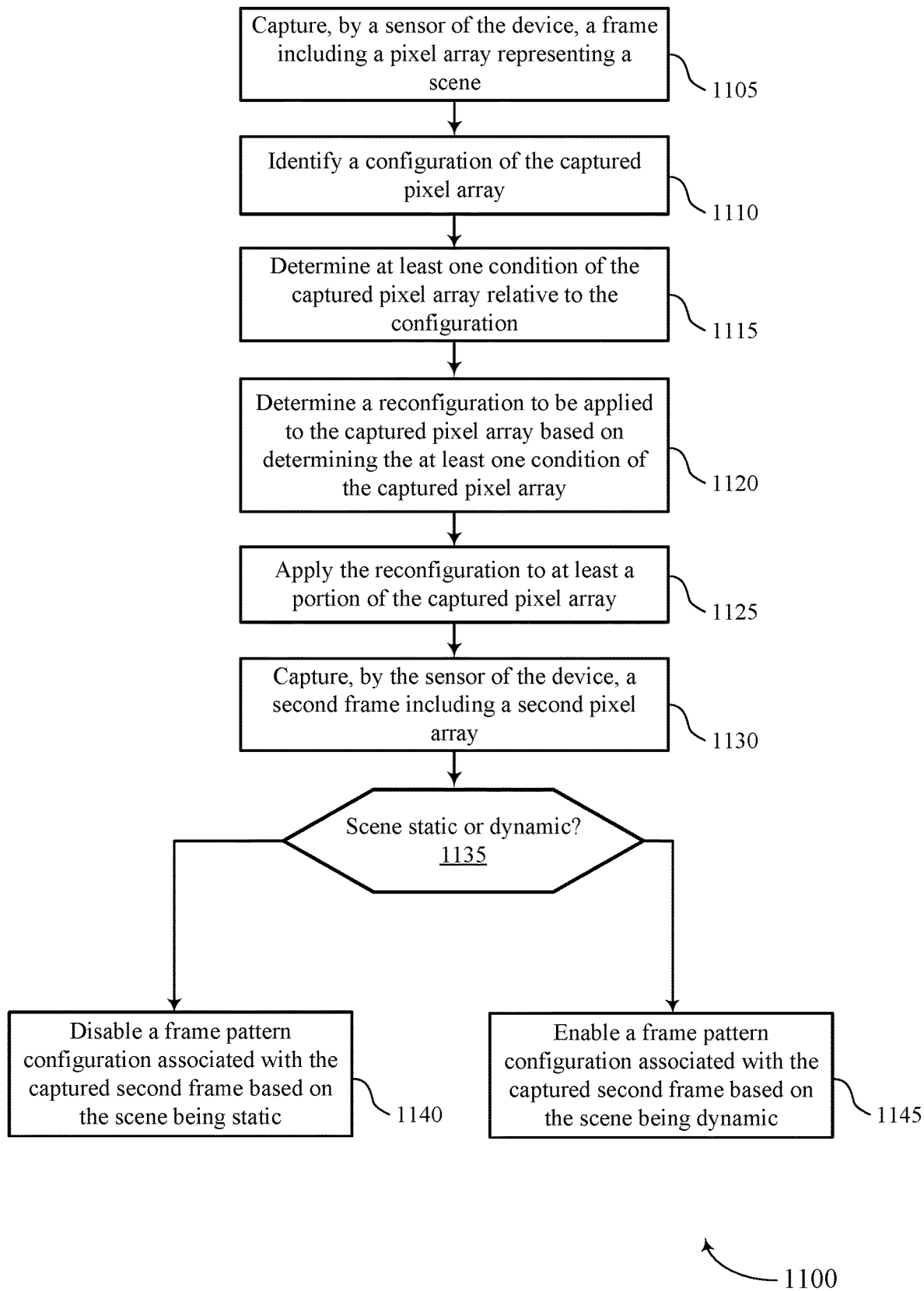

FIG. 11 shows a flowchart illustrating a method 1100 for PDAF power optimization in accordance with aspects of the present disclosure. The operations of method 1100 may be implemented by a device 115 or its components as described herein. For example, the operations of method 1100 may be performed by an AF manager as described with reference to FIGS. 5 through 7. In some examples, a device 115 may execute a set of codes to control the functional elements of the device to perform the functions described below. Additionally, or alternatively, the device 115 may perform aspects of the functions described below using special-purpose hardware.

At 1105 the device 115 may capture, by a sensor of the device 115, a frame including a pixel array representing a scene. The operations of 1105 may be performed according to the methods described herein. In certain examples, aspects of the operations of 1105 may be performed by a capturing component as described with reference to FIGS. 5 through 7.

At 1110 the device 115 may identify a configuration of the captured pixel array. The operations of 1110 may be performed according to the methods described herein. In certain examples, aspects of the operations of 1110 may be performed by a configuration component as described with reference to FIGS. 5 through 7.

At 1115 the device 115 may determine at least one condition of the captured pixel array relative to the configuration. The operations of 1115 may be performed according to the methods described herein. In certain examples, aspects of the operations of 1115 may be performed by a condition component as described with reference to FIGS. 5 through 7.

At 1120 the device 115 may determine a reconfiguration to be applied to the captured pixel array based on determining the at least one condition of the captured pixel array. The operations of 1120 may be performed according to the methods described herein. In certain examples, aspects of the operations of 1120 may be performed by a configuration component as described with reference to FIGS. 5 through 7.

At 1125 the device 115 may apply the reconfiguration to at least a portion of the captured pixel array. The operations of 1125 may be performed according to the methods described herein. In certain examples, aspects of the operations of 1125 may be performed by a configuration component as described with reference to FIGS. 5 through 7.

At 1130 the device 115 may capture, by the sensor of the device 115, a second frame including a second pixel array. The operations of 1130 may be performed according to the methods described herein. In certain examples, aspects of the operations of 1130 may be performed by a capturing component as described with reference to FIGS. 5 through 7.

At 1135 the device 115 may determine that the scene is static or dynamic based on sensor data, a correlation of the frame with the second frame, or both. The operations of 1135 may be performed according to the methods described herein. In certain examples, aspects of the operations of 1135 may be performed by a scene component as described with reference to FIGS. 5 through 7.

At 1140 the device 115 may disable a frame pattern configuration associated with the captured second frame based on the scene being static. In some examples, determining the configuration of the captured pixel array may be based on disabling the frame pattern configuration. The operations of 1140 may be performed according to the methods described herein. In certain examples, aspects of the operations of 1140 may be performed by a pattern component as described with reference to FIGS. 5 through 7.

At 1145 the device 115 may enable a frame pattern configuration associated with the captured second frame based on the scene being dynamic. In some examples, enabling the frame pattern configuration may include skipping one or more frames based on a preconfigured number. The operations of 1145 may be performed according to the methods described herein. In certain examples, aspects of the operations of 1145 may be performed by a pattern component as described with reference to FIGS. 5 through 7.

It should be noted that the methods described above describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for operating a camera device, comprising:
capturing, by a sensor of the camera device, a frame comprising a pixel array representing a scene;
identifying a configuration of the captured pixel array;
determining at least one condition of the captured pixel array relative to the configuration;
determining a reconfiguration to be applied to the captured pixel array based at least in part on determining the at least one condition of the captured pixel array;
applying the reconfiguration to at least a portion of the captured pixel array;
capturing, by the sensor of the camera device, a second frame comprising a second pixel array;
determining that the scene is dynamic based at least in part on sensor data, a correlation of the frame with the second frame, or both; and
enabling a frame pattern configuration associated with the captured second frame based at least in part on the scene being dynamic, wherein enabling the frame pattern configuration comprises skipping one or more frames based at least in part on a preconfigured number, and wherein identifying the configuration of the captured pixel array is based at least in part on enabling the frame pattern configuration.

2. The method of claim 1, further comprising:
determining a lens position for the camera device based at least in part on applying the reconfiguration;
determining that a confidence level associated with the lens position is above a threshold by comparing the confidence level to the threshold; and
capturing a third frame comprising a third pixel array using the lens position based on determining that the confidence level associated with the lens position is above the threshold, wherein capturing the frame is based at least in part on an initial lens position that is different from the lens position.

3. The method of claim 1, further comprising:
initializing a binning factor associated with a binning configuration based at least in part on a preconfigured parameter of the sensor, the binning configuration comprising a set of binning factors; and
applying the binning factor to the pixel array, wherein identifying the configuration of the captured pixel array is based at least in part on applying the binning factor to the pixel array.

4. The method of claim 3, further comprising:
determining a lens position of the camera device based at least in part on the binning factor; and
determining a confidence level of an autofocus associated with the determined lens position based at least in part on the binning factor, wherein determining the reconfiguration to be applied to the captured pixel array is based at least in part on determining the confidence level of the autofocus.

5. The method of claim 4, further comprising:
determining that the confidence level is above a threshold by comparing the confidence level to the threshold;
performing a contrast autofocus (AF) fine search based at least in part on the confidence level being above the threshold;
adjusting the lens position of the camera device based at least in part on the contrast AF fine search; and
capturing a third frame comprising a third pixel array representing the scene based at least in part on adjusting the lens position.

6. The method of claim 4, further comprising:
determining that the confidence level is below a threshold by comparing the confidence level to the threshold;
initializing a timer based at least in part on the confidence level being below the threshold; and
re-determining the lens position using a different binning factor from the set of binning factors after an expiration of the timer, wherein determining the reconfiguration to be applied to the captured pixel array is based at least in part on re-determining the lens position.

7. The method of claim 4, further comprising:
determining that the confidence level is below a threshold by comparing the confidence level to the threshold, wherein determining the reconfiguration for the captured pixel array is based at least in part on the confidence level being below the threshold,
wherein determining the at least one condition of the captured pixel array relative to the configuration comprises determining an illumination condition related to the pixel array representing the scene;
determining whether the binning factor is a minimum binning factor of the set of binning factors; and
determining a lower binning factor associated the set of binning factors based at least in part on the illumination condition, wherein applying the reconfiguration to at least the portion of the captured pixel array is based at least in part on determining the lower binning factor.

8. The method of claim 7, further comprising:
determining a second binning factor of the set of binning factors based at least in part on determining whether the binning factor is the minimum binning factor of the set of binning factors, wherein the second binning factor is different from the minimum binning factor of the set of binning factors and determining the reconfiguration to be applied to the captured pixel array is based at least in part on determining the second binning factor, wherein applying the reconfiguration to at least the portion of the captured pixel array comprises applying the second binning factor;
determining the lens position of the camera device based at least in part on applying the second binning factor;
determining that the confidence level associated with the determined lens position is above the threshold by comparing the confidence level to the threshold;
performing a contrast autofocus (AF) fine search based at least in part on the confidence level being above the threshold; and
adjusting the lens position of the camera device based at least in part on the contrast AF fine search.

9. The method of claim 7, further comprising:
performing a full contrast autofocus (AF) coarse search based at least in part on determining that the binning factor is the minimum binning factor of the set of binning factors;
determining the lens position of the camera device based at least in part on the full contrast AF coarse search;
performing a contrast AF fine search based at least in part on determining the lens position; and
adjusting the lens position of the camera device based at least in part on the contrast AF fine search.

10. The method of claim 1, further comprising:
determining, by the sensor of the camera device, a region of interest (ROI) associated with the pixel array representing the scene, wherein determining the at least one condition of the captured pixel array relative to the configuration is based at least in part on the determined ROI; and
configuring a region of the pixel array to the ROI based at least in part on skipping pixels outside the ROI, wherein determining the reconfiguration to be applied to the captured pixel array is based at least in part on configuring the region of the pixel array to the ROI.

11. The method of claim 1, wherein each pixel of the pixel array comprises a phase detection (PD) pixel having one or more values, or wherein the pixel array comprises one or more phase detection (PD) pixels positioned randomly across the pixel array.

12. A method for operating a camera device, comprising:
capturing, by a sensor of the camera device, a frame comprising a pixel array representing a scene;
identifying a configuration of the captured pixel array;
determining at least one condition of the captured pixel array relative to the configuration;
determining a reconfiguration to be applied to the captured pixel array based at least in part on determining the at least one condition of the captured pixel array;
applying the reconfiguration to at least a portion of the captured pixel array;
capturing, by the sensor of the camera device, a second frame comprising a second pixel array;
determining that the scene is static based at least in part on sensor data, a correlation of the frame with the second frame, or both; and
disabling a frame pattern configuration associated with the captured second frame based at least in part on the scene being static, wherein identifying the configuration of the captured pixel array is based at least in part on disabling the frame pattern configuration.

13. An apparatus, comprising:
a processor;
memory in electronic communication with the processor; and
instructions stored in the memory and executable by the processor to cause the apparatus to:
capture, by a sensor of the apparatus, a frame comprising a pixel array representing a scene;
identify a configuration of the captured pixel array;
determine at least one condition of the captured pixel array relative to the configuration;
determine a reconfiguration to be applied to the captured pixel array based at least in part on determining the at least one condition of the captured pixel array;
apply the reconfiguration to at least a portion of the captured pixel array;

capture, by the sensor of the apparatus, a second frame comprising a second pixel array;

determine that the scene is dynamic based at least in part on sensor data, a correlation of the frame with the second frame, or both; and enable a frame pattern configuration associated with the captured second frame based at least in part on the scene being dynamic, wherein enabling the frame pattern configuration comprises skipping one or more frames based at least in part on a preconfigured number, and wherein identifying the configuration of the captured pixel array is based at least in part on enabling the frame pattern configuration.

14. The apparatus of claim 13, wherein the instructions are further executable by the processor to cause the apparatus to:

determine a lens position for the apparatus based at least in part on applying the reconfiguration;

determine that a confidence level associated with the lens position is above a threshold by comparing the confidence level to the threshold; and capture a third frame comprising a third pixel array using the lens position based on determining that the confidence level associated with the lens position is above the threshold, wherein capturing the frame is based at least in part on an initial lens position that is different from the lens position.

15. The apparatus of claim 13, wherein the instructions are further executable by the processor to cause the apparatus to:

initialize a binning factor associated with a binning configuration based at least in part on a preconfigured parameter of the sensor, the binning configuration comprising a set of binning factors; and apply the binning factor to the pixel array, wherein identifying the configuration of the captured pixel array is based at least in part on applying the binning factor to the pixel array.

16. The apparatus of claim 15, wherein the instructions are further executable by the processor to cause the apparatus to:

determine a lens position of the apparatus based at least in part on the binning factor; and determine a confidence level of an autofocus associated with the determined lens position based at least in part on the binning factor, wherein determining the reconfiguration to be applied to the captured pixel array is based at least in part on determining the confidence level.

17. The apparatus of claim 16, wherein the instructions are further executable by the processor to cause the apparatus to:

determine that the confidence level is above a threshold by comparing the confidence level to the threshold;

perform a contrast autofocus (AF) fine search based at least in part on the confidence level being above the threshold;

adjust the lens position of the apparatus based at least in part on the contrast AF fine search; and capture a third frame comprising a third pixel array representing the scene based at least in part on adjusting the lens position.

18. The apparatus of claim 16, wherein the instructions are further executable by the processor to cause the apparatus to:

determine that the confidence level is below a threshold by comparing the confidence level to the threshold;

initialize a timer based at least in part on the confidence level being below the threshold; and re-determine the lens position using a different binning factor from the set of binning factors after an expiration of the timer, wherein determining the reconfiguration to be applied to the captured pixel array is based at least in part on re-determining the lens position.

19. The apparatus of claim 16, wherein the instructions are further executable by the processor to cause the apparatus to:

determine that the confidence level is below a threshold by comparing the confidence level to the threshold, wherein determining the reconfiguration for the captured pixel array is based at least in part on the confidence level being below the threshold, and wherein determining the at least one condition of the captured pixel array relative to the configuration comprises determining an illumination condition related to the pixel array representing the scene;

determine whether the binning factor is a minimum binning factor of the set of binning factors; and determine a lower binning factor associated the set of binning factors based at least in part on the illumination condition, wherein applying the reconfiguration to at least the portion of the captured pixel array is based at least in part on determining the lower binning factor.

20. The apparatus of claim 13, wherein the instructions are further executable by the processor to cause the apparatus to:

determine, by the sensor of the apparatus, a region of interest (ROI) associated with the pixel array representing the scene, wherein determining the at least one condition of the captured pixel array relative to the configuration is based at least in part on the determined ROI; and configure a region of the pixel array to the ROI based at least in part on skipping pixels outside the ROI, wherein determining the reconfiguration to be applied to the captured pixel array is based at least in part on configuring the region of the pixel array to the ROI.

* * * * *